(12) United States Patent
Dvir et al.

(10) Patent No.: US 11,706,274 B2
(45) Date of Patent: Jul. 18, 2023

(54) SCALABLE FOV+ FOR VR 360 VIDEO DELIVERY TO REMOTE END USERS

(71) Applicant: HUAWEI TECHNOLOGIES CO., LTD., Guangdong (CN)

(72) Inventors: Itsik Dvir, Hod Hasharon (IL); Amiram Allouche, Hod Hasharon (IL); Feng Li, Nanjing (CN); Boris Sukholitko, Munich (DE); Guy Almog, Munich (DE); Guanhua Zhuang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 70 days.

(21) Appl. No.: 16/906,287

(22) Filed: Jun. 19, 2020

(65) Prior Publication Data

US 2020/0322403 A1    Oct. 8, 2020

Related U.S. Application Data

(63) Continuation of application No. PCT/EP2018/068313, filed on Jul. 5, 2018.

(30) Foreign Application Priority Data

Dec. 22, 2017    (WO) ................ PCT/EP2017/084477

(51) Int. Cl.
*H04L 65/80* (2022.01)
*H04L 65/611* (2022.01)
(Continued)

(52) U.S. Cl.
CPC ........ *H04L 65/611* (2022.05); *G06F 3/04815* (2013.01); *G06T 15/205* (2013.01);
(Continued)

(58) Field of Classification Search
CPC . G06F 3/04815; G06T 15/205; G06T 19/006; G06T 2210/08; G06T 2210/12;
(Continued)

(56) References Cited

U.S. PATENT DOCUMENTS 8,949,913 B1 *  2/2015  Thakkar .................. G06F 16/50
                                                            725/116
2002/0021353 A1   2/2002  Denies
(Continued)

FOREIGN PATENT DOCUMENTS

CN    105939482 A    9/2016
CN    106358033 A    1/2017
(Continued)

OTHER PUBLICATIONS

Spherical viewport SEI for HEVC and AVC 360 video by Jill Boyce (Year: 2017).*
(Continued)

*Primary Examiner* — Sibte H Bukhari

(57) ABSTRACT

A distribution device for delivering a selected viewport stream of virtual reality (VR) data to each of a plurality of client devices, comprising a processor configured for receiving a plurality of extended viewport streams of a VR video file each comprising a sequence of extended field of view (EFOV) frames created for a respective one of a plurality of overlapping segments constituting a sphere defined in the VR video file and delivering a selected one of the plurality of extended viewport streams to each of a plurality of client devices by performing the following for each of the client devices in each of a plurality of iterations: (1) receiving a current orientation data of the respective client device; (2) selecting one of the plurality of extended viewport streams
(Continued)

according to the current orientation data; and (3) transmitting the selected extended viewport stream to the respective client device.

15 Claims, 13 Drawing Sheets

(51) Int. Cl.
| | |
|---|---|
| *H04N 13/279* | (2018.01) |
| *G06T 15/20* | (2011.01) |
| *G06T 19/00* | (2011.01) |
| *H04N 13/117* | (2018.01) |
| *G06F 3/04815* | (2022.01) |
| *H04N 5/262* | (2006.01) |
| *H04N 21/426* | (2011.01) |
| *H04N 21/81* | (2011.01) |
| *H04N 23/698* | (2023.01) |

(52) U.S. Cl.
CPC ............ *G06T 19/006* (2013.01); *H04L 65/80* (2013.01); *H04N 5/2628* (2013.01); *H04N 13/117* (2018.05); *H04N 13/279* (2018.05); *H04N 21/42653* (2013.01); *H04N 21/816* (2013.01); *H04N 23/698* (2023.01)

(58) Field of Classification Search
CPC . G06T 2210/22; H04L 65/4076; H04L 65/80; H04N 13/117
USPC .......................................................... 709/231
See application file for complete search history.

(56) References Cited

U.S. PATENT DOCUMENTS

| | | | |
|---|---|---|---|
| 2016/0260196 A1 | 9/2016 | Roimela et al. | |
| 2018/0098131 A1 | 4/2018 | Zhou | |
| 2018/0160160 A1* | 6/2018 | Swaminathan | ......... H04L 65/80 |
| 2018/0164593 A1* | 6/2018 | Van Der Auwera | ......................... H04N 21/816 |
| 2020/0374488 A1 | 11/2020 | Boyce | |

FOREIGN PATENT DOCUMENTS

| | | |
|---|---|---|
| EP | 3065406 A1 | 9/2016 |
| WO | 2017127816 A1 | 7/2017 |

OTHER PUBLICATIONS

Chinese-language Office Action issued in Chinese Application No. 201880082956.7 dated Jan. 6, 2021 (9 pages).

Boyce J et al, "Spherical viewport SEI for HEVC and AVC 360 video", Joint Collaborative Team on Video Coding (JCT-VC) of ITU-T SG 16 WP 3 and ISO/IEC JTC 1/SC 2 9/WG 11. JCTVC-Z0034, 26th Meeting: Geneva, CH, Jan. 12-20, 2017, total 6 pages. XP030118141.

Yan Ye, "Algorithm descriptions of projection format conversion and video quality metrics in 360Lib (Version 5)", Joint Video Exploration Team (JVET) of ITU-T SG 16 WP 3 and ISO/IEC JTC 1/SC 29/WG 11. JVET-H1004, 8th Meeting: Macao, CN, Oct. 18-24, 2017, total 46 pages. XP030151112.

Lan Xie et al, "360ProbDASH: Improving QoE of 360 Video Streaming Using Tile-based HTTP Adaptive Streaming", Proceedings of the 2017 ACM on Multimedia Conference , MM '17, Oct. 23-27, 2017, p. 315-323, XP055505663.

ISO/IEC FDIS 23090-2:201x (E), ISO/IEC JTC 1/SC 29/WG 11, "Information technology-Coded representation of immersive media (MPEG-I)—Part 2: Omnidirectional media format", Apr. 24, 2018. total 182 pages. XP030024190.

Van Der Auwera G et al, "AHG8: Truncated Square Pyramid Projection (TSP) For 360 Video", Joint Video Exploration Team (JVET) of ITU-T SG 16 WP 3 and ISO/IEC JTC 1/SC 29/WG 11, No. JVET-D0071, 4th Meeting: Chengdu, CN, Oct. 15-21, 2016, total 10 pages. XP030150304.

Huawei:"Whitepaper on the VR-Oriented Bearer Network Requirement" (2016), Sep. 15, 2016. Retrieved from the internet:https://www-file.huawei.com/~/media/CORPORATE/PDF/white%20paper/whitepaper-on-the-vr-oriented-bearer-network-requirement-en.pdf, total 54 pages.

Robert Skupin et al. "Tile Based HEVC Video for Head Mounted Displays", 2016 IEEE International Symposium on Multimedia, pp. 399-400.

Evgeny Kuzyakov et al. "Next-generation video encoding techniques for 360 video and VR", Jan. 21, 2016, total 7 pages.

Yan Ye et al., Algorithm descriptions of projection format conversion and video quality metrics in 360Lib, JVET-F1003-V1, 6th Meeting: Hobart, AU, Mar. 31-Apr. 7, 2017, Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, total 33 pages.

International Search Report and Written Opinion issued in PCT/EP2018/068313, dated Nov. 7, 2018, total 19 pages.

International Search Report and Written Opinion issued in PCT/EP2018/084477, dated Oct. 2, 2017, total 11 pages.

* cited by examiner

ND USERS

SCALABLE FOV+ FOR VR 360 VIDEO DELIVERY TO REMOTE END USERS

CROSS-REFERENCE TO RELATED APPLICATIONS

This application is a continuation of International Application No. PCT/EP2018/068313, filed on Jul. 5, 2018, which claims priority to International Application No. PCT/EP2017/084477, filed on Dec. 22, 2017, The disclosures of the aforementioned applications are hereby incorporated by reference in their entireties.

FIELD

The present invention, in some embodiments thereof, relates to streaming Virtual Reality (VR) 360 video content to client devices and, more particularly, but not exclusively, to low latency, high resolution and high throughput VR 360 video content streaming to extremely large numbers of client devices.

BACKGROUND

Consumption of VR 360 video content, i.e. 360-degree videos, immersive videos or spherical videos is constantly increasing. This may result from rapid advances in the capabilities of traditional devices, for example, desktop computers, laptop computers, Smartphones, tablets and/or the like having displays (screens) supporting 2 Dimensions (2D) presentation, i.e. a monoscopic presentation in which one image is directed to both eyes. However, the major driving force for the increase in VR 360 video content consumption may be the increased availability and reduced costs of VR 360 client devices, for example, Head Mounted Displays (HMD), stereoscopic goggles and/or the like supporting 3 Dimensions (3D) presentation. i.e. a stereoscopic presentation in which two distinct images are directed individually to different eyes for a 3D effect. Moreover, there is a continuous demand for better user experience, requiring high resolution image size (e.g., 8K, 16K), high frame rate (e.g., 60, 90 fps) and low Motion to Photon (MTP) latency (e.g., below 20 milliseconds).

On-line streaming of such VR 360 video content is therefore highly desired as the market potential for such streaming is practically endless for a plurality of applications, ranging from gaming applications, through training and simulation applications to life saving medical applications and/or defense applications.

SUMMARY

According to a first aspect there is provided an encoding apparatus for generating a plurality of extended viewport (EVP) streams of virtual reality (VR) data for delivery to a plurality of client devices, comprising a processor configured for:

Segmenting a sphere defined in a VR video file projected in an equirectangular projection (ERP) format into a plurality of overlapping segments.

Creating a plurality of EVP streams for the VR video file by performing the following in each one of a plurality of iterations:

Applying a rotation to each of the plurality of overlapping segments of the sphere.

Cropping from each of the plurality of rotated overlapping segments of the sphere a respective extended field of view (EFOV) frame.

Instructing a network to transmit the respective EFOV frame of each of the plurality of rotated overlapping segments to one or more distribution devices.

According to a second aspect there is provided a method for generating a plurality of extended viewport (EVP) streams of VR data for delivery to a plurality of client devices, comprising operating a processor of an encoding apparatus to perform the following:

Segmenting a sphere defined in a VR video file projected in an equirectangular projection (ERP) format into a plurality of overlapping segments.

Creating a plurality of EVP streams for the VR video file by performing the following in each one of a plurality of iterations:

Applying a rotation to each of the plurality of overlapping segments of the sphere.

Cropping from each of the plurality of rotated overlapping segments of the sphere a respective extended field of view (EFOV) frame.

Instructing a network to transmit the respective EFOV frame of each of the plurality of rotated overlapping segments to one or more distribution devices.

The plurality of EVP streams correspond to overlapping segments of the sphere defined by the VR 360 video file and the viewports of the EVP streams and therefore encompass all viewports of the VR 360 video file. As such the EVP streams are sufficient for serving any FOV selected by a user of a client device consuming the VR 360 video file. The number of serviced client devices may therefore be extremely large. Moreover, the number of EVP streams required for encompassing the entire sphere may be limited (finite) and relatively small. Generating the finite and relatively small number of EVP streams may significantly reduce the computing resources required by the encoding apparatus thus making high throughput VR 360 video content delivery feasible, cheaper and hence more attractive for adoption in a plurality of content applications, platforms and/or services.

According to a third aspect there is provided a distribution device for delivering a selected one of a plurality of viewports of virtual reality (VR) data to each of a plurality of client devices, comprising a processor configured for:

Receiving, via a network, a plurality of EVP streams of a VR video file. Each of the plurality of EVP streams comprises a sequence of extended field of view (EFOV) frames created for a respective one of a plurality of overlapping segments constituting a sphere defined in the VR video file.

Delivering a selected one of the plurality of EVP streams to each of a plurality of client devices connected to the distribution device via one or more other networks by performing the following for each of the plurality of client devices in each of a plurality of iterations:

Receiving a current orientation data of the respective client device.

Selecting one of the plurality of EVP streams according to the current orientation data.

Transmitting the selected EVP stream to the respective client device.

According to a fourth aspect there is provided a method of delivering a selected one of a plurality of extended viewport (EVP) streams of virtual reality (VR) data to each of a plurality of client devices, comprising using a processor of a distribution device for:

Receiving, via a network, a plurality of EVP streams of a VR video file. Each of the plurality of EVP streams comprises a sequence of extended field of view (EFOV) frames created for a respective one of a plurality of overlapping segments constituting a sphere defined in the VR video file.

Delivering a selected one of the plurality of EVP streams to each of a plurality of client devices connected to the distribution device via one or more other networks by performing the following for each of the plurality of client devices in each of a plurality of iterations:

Receiving a current orientation data of the respective client device.

Selecting one of the plurality of EVP streams according to the current orientation data.

Transmitting the selected EVP stream to the respective client device.

Deploying the distribution devices between the encoding apparatus and the plurality of client devices decouples the link between the encoding apparatus and the client devices to support service of the VR 360 video file to extremely large numbers of client devices. The distribution device serves as a switch which receives all of the EVP streams created by the encoding apparatus to encompass any FOV (any viewport) of the VR 360 video file and delivers the most appropriate EVP stream to each of the plurality of client devices according to the orientation data received from each client device indicating the current FOV of the client device. The switching operation may be a simple task requiring significantly low computing resources thus significantly reducing the cost of the distribution device. Moreover, the distribution device(s) may be deployed at the edge of the network serving the client devices and may therefore support a low latency transmission link with the client devices which may significantly improve the MTP and hence the user using the client device for consuming the VR 360 video content may experience a significantly improved Quality of Experience (QoE).

In a further implementation form of the first and/or second aspects, the processor segments the sphere into the plurality of overlapping segments according to an area of the EFOV frame calculated according to a maximum angular velocity of a display used to present one of the plurality of EVP streams. Adjusting the EFOV area size according to the maximum angular velocity of the client device (specifically the display of the client device) may allow sufficient extra presentation area used locally by the client device to effectively compensate for network latency. The maximal FOV change may not exceed the maximum angular velocity, and therefore by providing the adjusted extra area FOV frames may be generated by the client device from the EFOV even for the maximum FOV change.

In a further implementation form of the first and/or second aspects, the processor is further configured to segment the sphere to the plurality of overlapping segments according to an area of the EFOV frame calculated according to an estimated latency value for a communication between the apparatus and the one or more distribution devices, wherein the processor calculates the estimated latency value according to a time stamp included in a Quality of Experience, QoE, message comprising Round Trip delay Time (RTT) data originating from one or more of the distribution devices. As the extra area of the EFOV is used by the client device to compensate for the network latency, adjusting the EFOV size to include the extra presentation area according to the network latency may allow effective compensation for the estimated latency.

In a further implementation form of the first and/or second aspects, the processor is configured to encode the EFOV frame in one of a plurality of projection formats, the plurality of projection formats include one or more members of a group consisting of: ERP, rectilinear projection, cubemap projection, CMP, equal-area projection, EAP, octahedron projection, OHP and Platonic Solid Projection, and PSP. Generating the EVP streams to support a wide range of industry standard projection formats may allow simple, easy and cost effective adaptation of the encoding device and the VR 360 video distribution architecture to a plurality of application, services and/or platforms.

In a further implementation form of the first and/or second aspects, the processor converts each EFOV frame from the equirectangular projection format to a rectilinear format before added to a respective one of the plurality of EVP streams. The rectilinear format may be a commonly used format and therefore supporting this format may further allow for simple, easy and cost effective adaptation of the encoding device and the VR 360 video distribution architecture to a plurality of application, services and/or platforms.

In a further implementation form of the first and/or second aspects, the processor is further configured to create a plurality of instantaneous decoding refresh (IDR) shifted viewport streams for each of the plurality of EVP streams by repeating each of the plurality of iterations starting in a consecutive frame of a group of pictures (GOP) of the VR video file. The number of the plurality of IDR shifted viewport streams created for each of the plurality of EVP streams equals a number of frames in the GOP such that each of the plurality of IDR shifted viewport streams of each of the plurality of EVP streams includes an IDR frame at a different frame position in the GOP. The IDR shifted EVP streams may allow a smooth transition between EVP streams corresponding to adjacent viewports (overlapping segments) when switching between EVP streams for client device(s) in response to FOV change of the client device(s). Since each EVP stream may be independent IDR (reference) frames from one EVP stream may not be used for another EVP stream. Therefore in case of switching the client device needs to use the IDR frames of the newly delivered EVP stream. By providing a plurality of IDR shifted EVP streams for each viewport (overlapping segment) the IDR shifted EVP stream having an IDR frame located within the GOP at the exact point in time of the switch may be provided to the client device. This may significantly reduce and potentially prevent artifacts resulting from IDR frame gaps, use of irrelevant IDR frames (of the previously delivered EVP stream) and/or the like thus significantly improving the user QoE.

In a further implementation form of the first and/or second aspects, the processor is further configured to locally store one or more of the plurality of EVP streams in the encoding apparatus until requested by the one or more distribution devices. Locally storing the EVP streams at the encoding apparatus may be applied for delivering non real-time VR 360 content, for example, Video on Demand (VOD) and/or the like. The encoding apparatus may generate the EVP streams for the VR 360 video file and locally store them. At a later time the encoding apparatus may deliver the stored EVP streams on demand.

In a further implementation form of the third and/or fourth aspects, one or more of the plurality of EVP streams are locally stored in the distribution device after reception until delivery to one or more of the client devices. Locally storing the EVP streams at the distribution device may be applied for delivering non real-time VR 360 content, for example, VOD and/or the like. The distribution device may receive the EVP streams for the VR 360 video file from the encoding apparatus and locally store them. At a later time the distribution device may deliver the stored EVP streams on demand.

In a further implementation form of the third and/or fourth aspects, the orientation data comprises one or more members of a group consisting of: a horizontal field of view, FOV, angle value, a vertical FOV angle value, a yaw value, a roll value and a pitch value, of the respective client device. The orientation data of each client device is essential for the distribution device to select the most appropriate EVP stream for transmission (delivery) to the client device since the orientation data indicates the current FOV selected by the user and therefore needs to be highly accurate.

In a further implementation form of the third and/or fourth aspects, the current orientation data of the respective client device comprises a time stamp. The time stamp may be used for measuring, calculating and/or collecting network latency information, for example, RTT, MTP and/or the like.

In a further implementation form of the third and/or fourth aspects, the current orientation data of the respective client device comprises an indication of a currently presented frame within a group of pictures (GOP) of the respective EVP stream comprising the EFOV currently presented by a display of the respective client device. In order for the distribution device to accurately select the most suitable IDR shifted EVP stream in case of a switch of EVP streams (in response to FOV change of the user), the distribution device may need to identify the position within the GOP of the frame currently presented by the client device (specifically the display of the client device).

In a further implementation form of the third and/or fourth aspects, for each of the plurality of client devices, the processor is further configured to select one of a plurality of instantaneous decoding refresh, IDR, shifted viewport streams received for each of the plurality of EVP streams, and each of the plurality of IDR shifted viewport streams received for each of the plurality of EVP streams includes an IDR frame at a different frame position in the GOP, of the respective EVP stream. The processor selects the selected IDR shifted viewport stream according to the indication of the currently presented frame received from the respective client device in case, based on the current orientation data received from the respective client device, the processor determines to switch from a current EVP stream of the plurality of EVP streams currently transmitted to the respective client device to an adjacent viewport stream of the plurality of EVP streams. The adjacent EVP stream comprises EFOV frames created for an overlapping segment of the plurality of overlapping segments which is adjacent to a current overlapping segment of the plurality of overlapping segments encoded in the current EVP stream.

In case of switching between EVP streams delivered to a client device, delivering the IDR shifted EVP stream in which the IDR frame is located within the GOP at the exact point in time of the switch may significantly reduce and potentially prevent artifacts resulting from IDR frame gaps, use of irrelevant IDR frames (of the previously delivered EVP stream) and/or the like thus significantly improving the user QoE.

In a further implementation form of the third and/or fourth aspects, the processor is further configured to select the EVP stream for one or more of the plurality of client devices according to a prediction of future orientation data estimated for that client device. Predicting the orientation data reflecting the FOV selected by the user may allow effective and efficient selection of the most appropriate EVP stream delivered to the client device even before updated orientation data is available from the client device. This may significantly improve the QoE of the user.

In a further implementation form of the third and/or fourth aspects, the processor is further configured to select the EVP stream for one or more of the plurality of client devices according to a request received from the respective client device indicating a requested EVP stream. Moving the selection (switching) logic to the client device may further simplify the distribution device which may require significantly less computing resources and/or the like thus reducing a cost of the distribution device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 7:
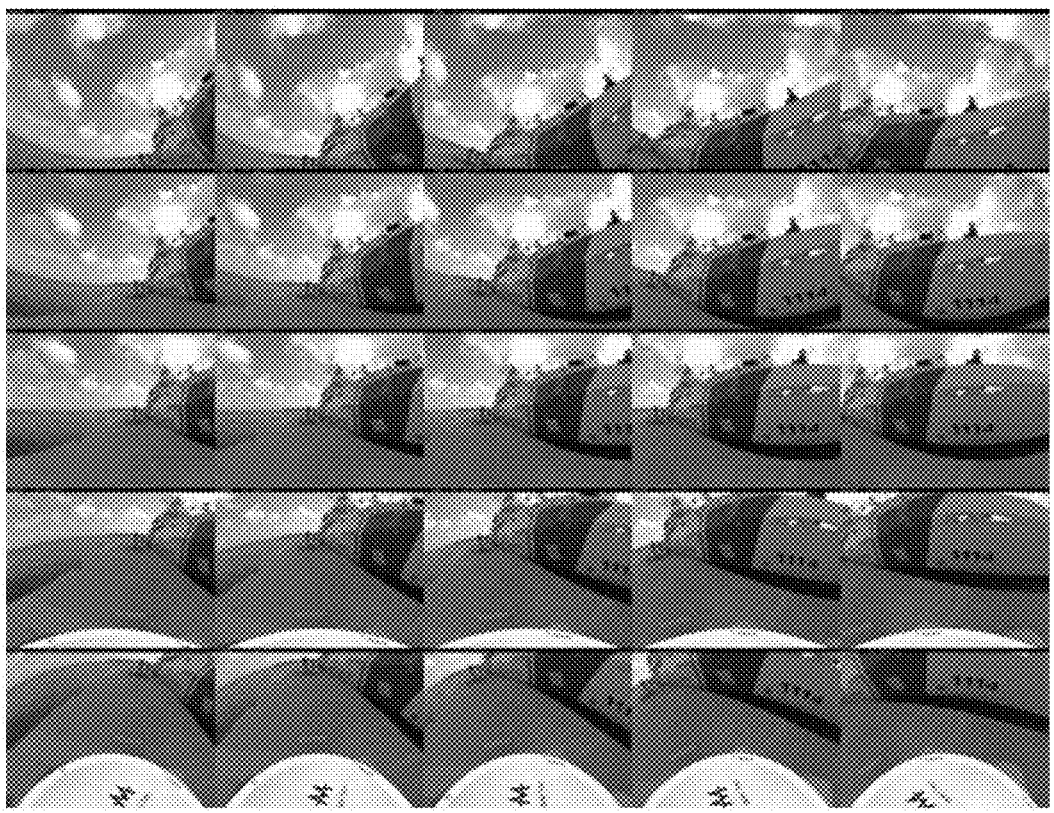
Figure 8:
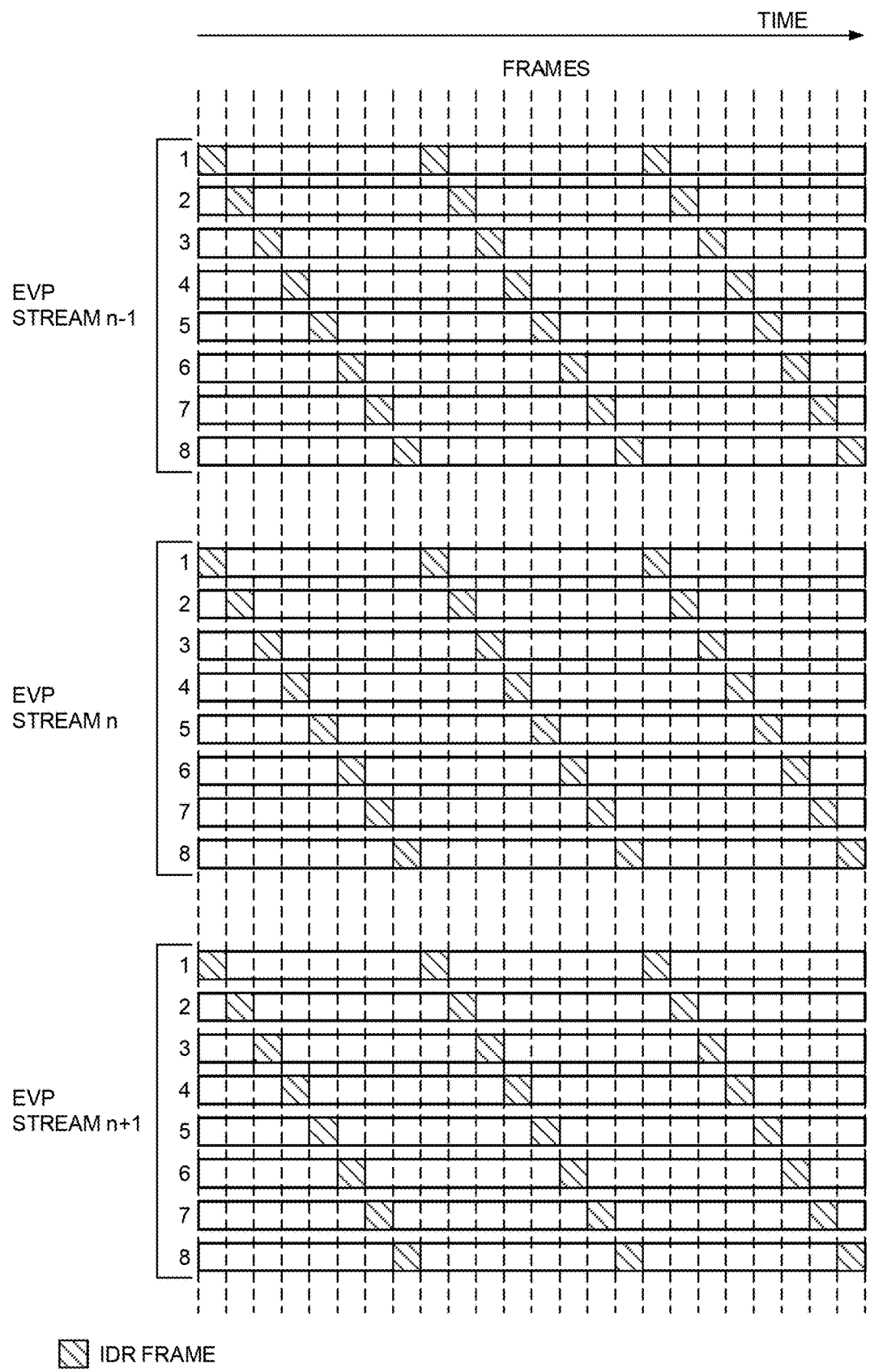
Figure 9:
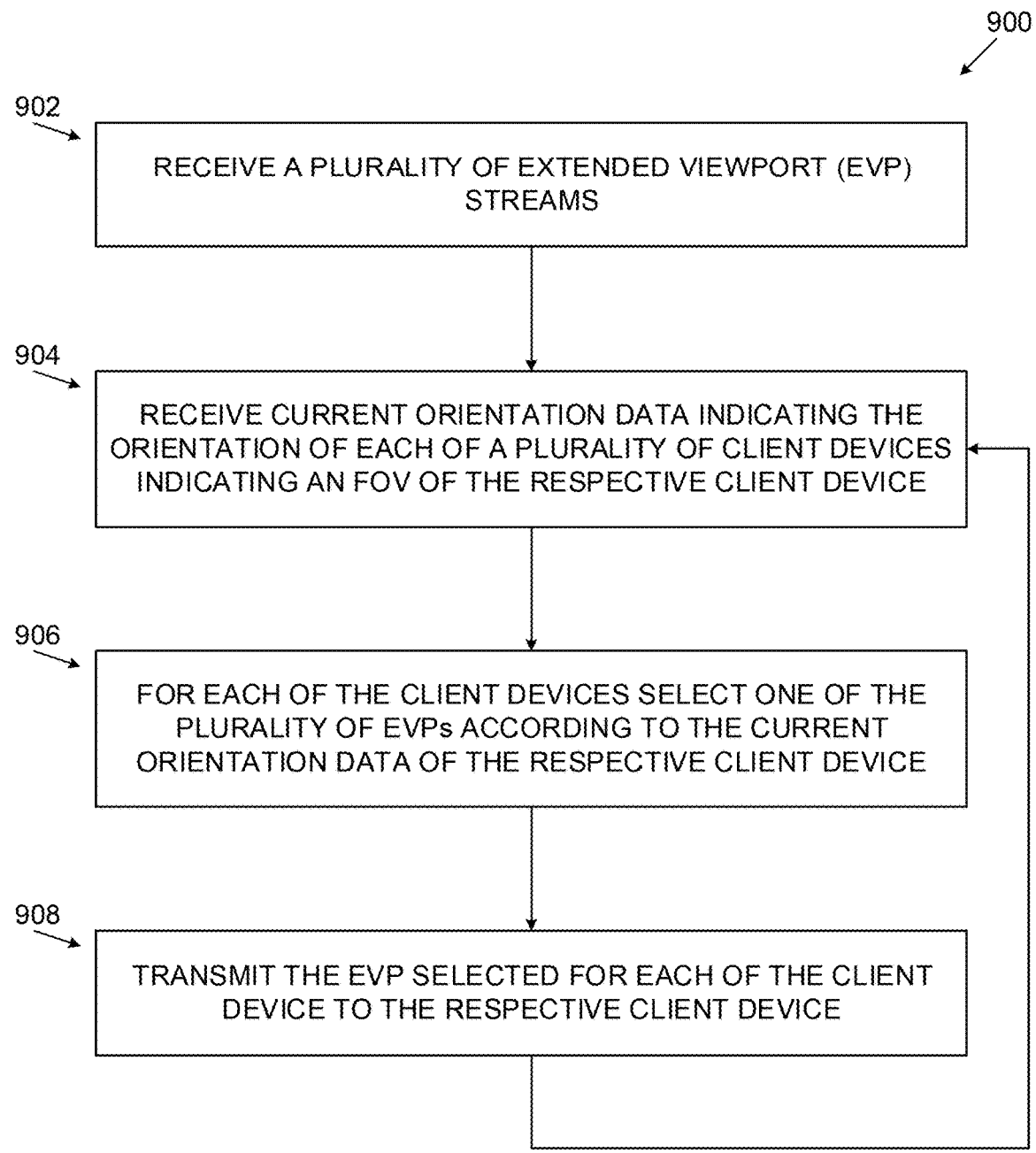
Figure 10:
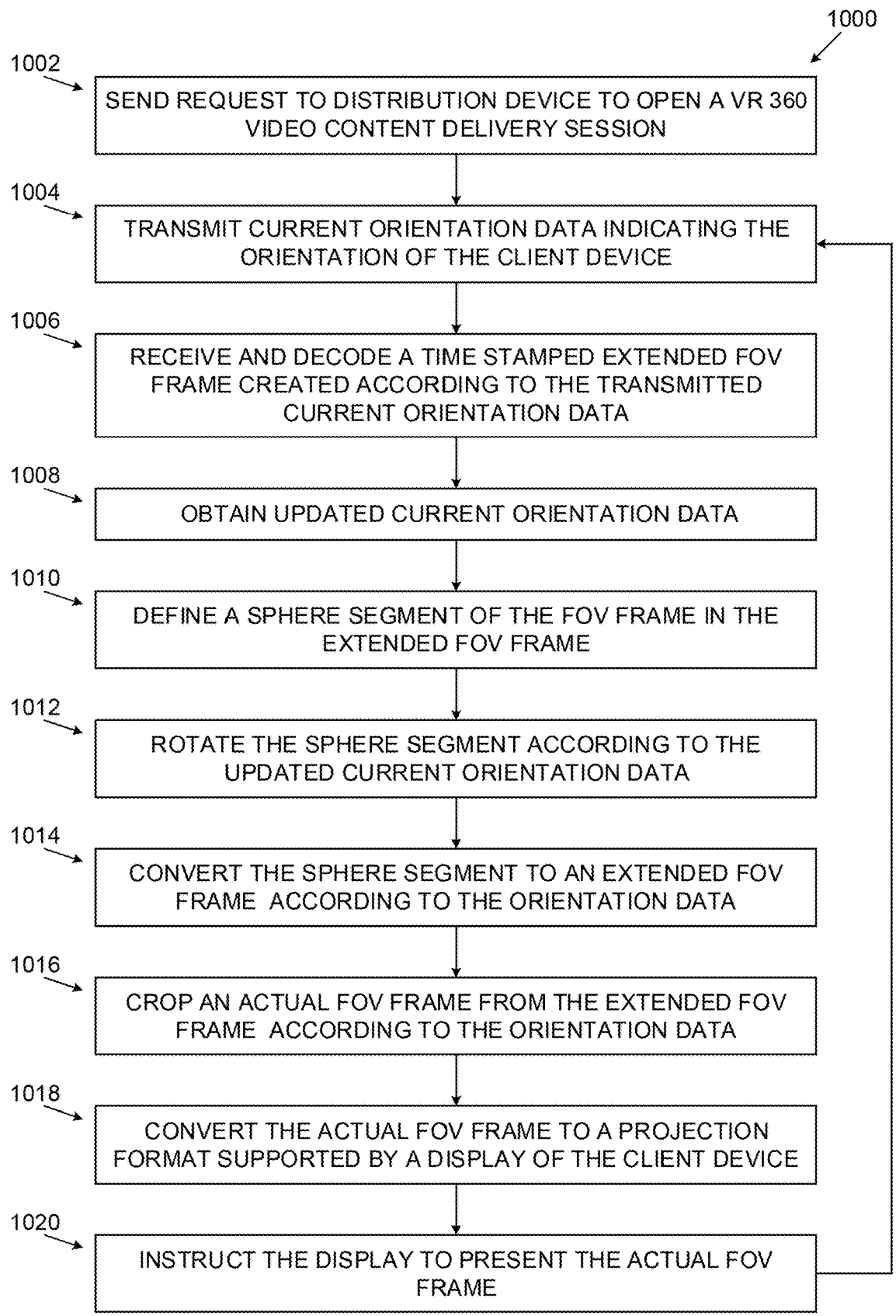
Figure 11:
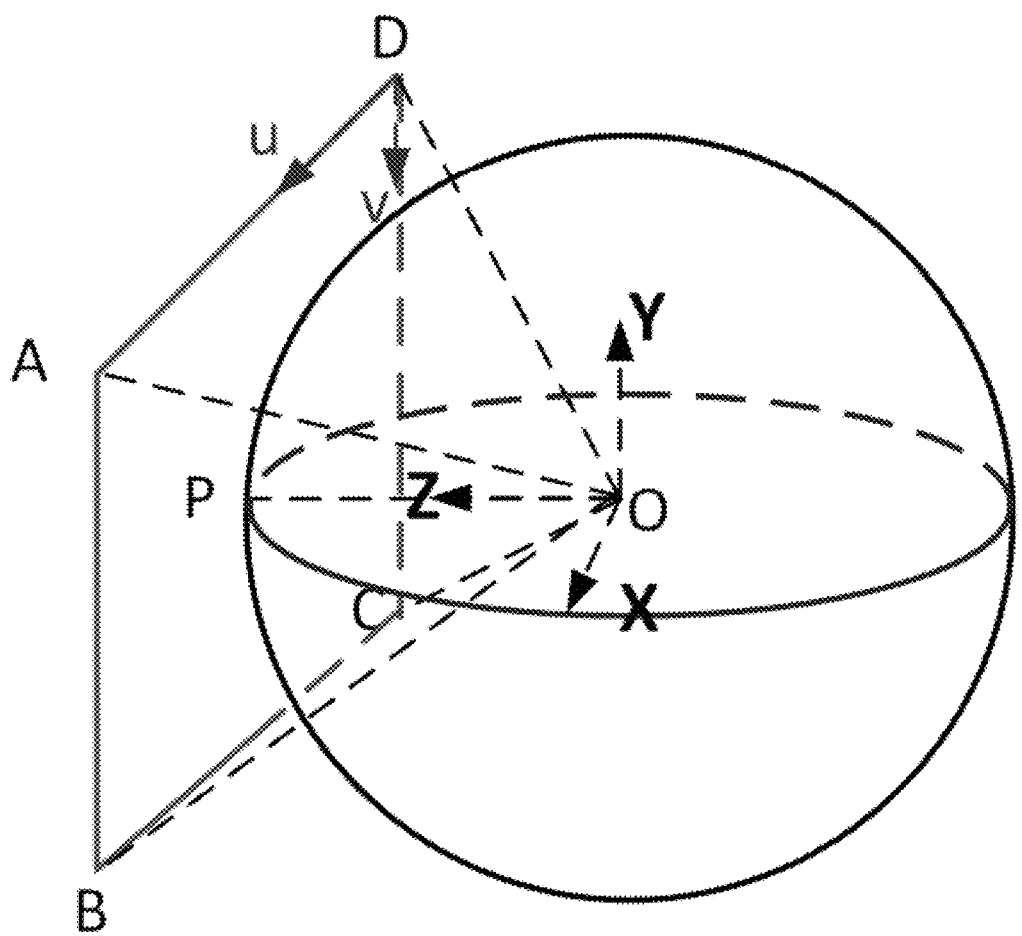

FIG. 7 presents a plurality of captured EFOV frames each generated for a respective one of a plurality of overlapping segments of a sphere defined by a VR 360 video file, according to some embodiments of the present invention;

FIG. 8 is a schematic illustration of a plurality of Instantaneous Decoding Refresh (IDR) Shifted EVP streams generated for a plurality of viewports of a sphere defined by a VR 360 video file, according to some embodiments of the present invention;

FIG. 9 is a flowchart of an exemplary process executed by a distribution device for delivering EVP streams to a plurality of client devices, according to some embodiments of the present invention;

FIG. 10 is a flowchart of an exemplary process executed by a client device for receiving EVP streams of a VR 360 video file presented by a display to a user, according to some embodiments of the present invention;

FIG. 11 is a schematic illustration of a viewport projection: and

Figure 12:
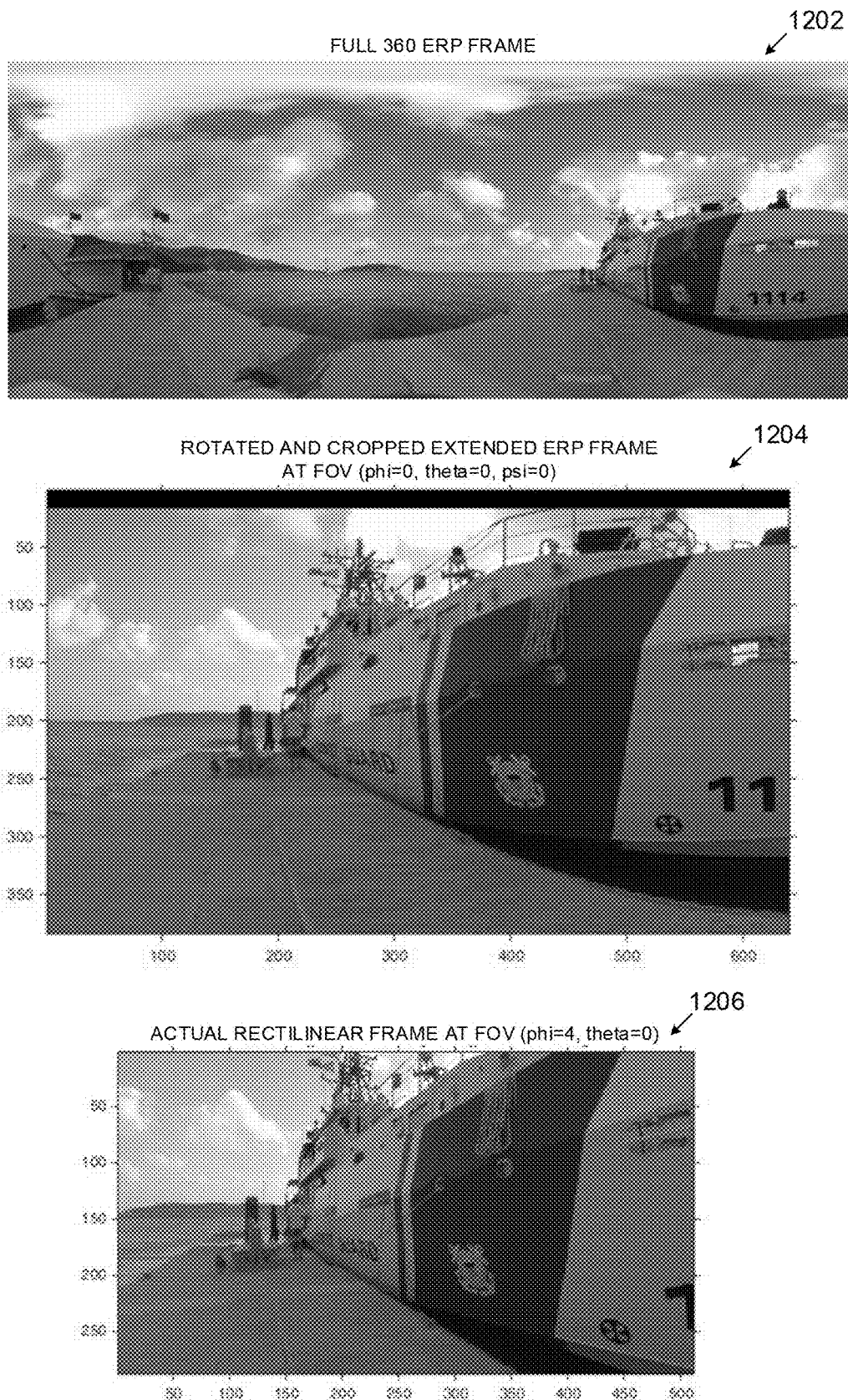

FIG. 12 is a capture of an exemplary VR 360 video frame, an exemplary respective EFOV frame generated from the VR 360 video frame and a respective actual FOV frame generated from the EFOV frame, according to some embodiments of the present invention.

DESCRIPTION OF SPECIFIC EMBODIMENTS

The present invention, in some embodiments thereof, relates to streaming Virtual Reality (VR) 360 video content to client devices and, more particularly, but not exclusively, to low latency, high resolution and high throughput VR 360 video content streaming to extremely large numbers of client devices.

Delivering (streaming) the VR 360 video content, for example, a VR 360 video file and/or the like from an encoding apparatus, for example, a server, a computing node, a cluster of computing nodes, a cloud service and/or the like to a client device, for example, a Head Mount Display (HMD), stereoscopic goggles, a laptop computer, a desktop computer, a mobile device (e.g., Smartphone, tablet, etc.) and/or the like for presentation to a user may be highly desirable.

Such VR 360 video content delivery may present significant challenges due to the high data volume of the VR 360 video content. The challenge may further increase when the VR 360 video content is high quality video (high resolution, e.g., 4K, 8K, 16K), supporting high frame rates, high motion, rapid scene changes and/or the like thus comprising higher volumes of data.

Transferring the VR 360 video content may therefore require high communication resources, specifically high network bandwidth (throughput) and/or low latency. Moreover, the user viewing (consuming) the VR 360 video content may frequently change his Field Of View (FOV) on the VR 360 video content. In order to maintain a sufficiently high Quality of Experience (QoE) for the user, the latency between the FOV changes initiated by the user and adjustment of the presentation of the VR 360 video content accordingly must be significantly low. Such latency may be expressed by the term Motion to Photon (MTP) latency which indicates the latency between a time of a motion (for selecting the FOV) and the time of presentation of the respective presentation (photon). For client devices supporting 3D presentation (stereoscopic), for example, the HMD, the stereoscopic goggles and/or the like the MTP latency must be extremely low since high MTP latency may cause the user to experience nausea, motion sickness, loss of orientation and/or suffer other undesired effects.

Furthermore, processing, encoding/decoding, and/or generating the VR 360 video content may require high computing resources, for example, processing resources, storage resources, communication resources and/or the like which may present a major limitation, mainly for the client device which may have limited such resources.

According to some embodiments of the present invention, there are provided methods, systems and computer program products for delivering VR 360 video content to extremely large numbers of client devices while maintaining high throughput of the content delivery and low latency, in particular low MTP latency.

The high throughput VR 360 video content delivery (streaming) is based on three main concepts.

The first concept is that at any given time the user may view only a significantly small portion of the overall VR 360 video presentation (frames), typically 90-120 degrees in most client devices and therefore only the relevant portion of the presentation (frame) needs to be delivered to the client device. The segment of the VR 360 video content frames delivered to the client device may be referred to herein after as Extended FOV (EFOV or FOV+) frames which are encoded in an Extended Viewport (EVP) stream. The Extended Viewport (EVP) stream may be encoded using one or more video encoding protocols as known in the art, for example, MPEG, H.264, H.265, H.266 and/or the like. Delivering only a significantly small segment of the VR 360 video content (i.e. the EFOV frames) to the client device may significantly reduce the required network bandwidth. Moreover, delivering the EFOV frames may significantly reduce the computing resources required at the client device to process the received VR 360 video content. The segment of the VR 360 video content (EFOV frames) delivered to the client device is selected according to current orientation data received from the client device. The current orientation data indicates the current orientation of the client device, specifically the current FOV selected by the user to view the VR 360 video content.

The second concept is splitting processing of the VR 360 video content between the encoding apparatus delivering the VR 360 video content (EVP streams) and the client device. The Quality of Service (QoS) of the network, i.e. the network latency which may be expressed by Round Trip delay Time (RTT), may significantly reduce the QoE. The encoding apparatus may therefore provide the client device with additional (extra) presentation data exceeding the FOV presented and seen by the user (FOV frames). This means that the EFOV frames comprise a larger area (FOV) then their respective FOV frames. The client device may use the extra presentation data to adjust the VR 360 video content presentation according to an updated FOV of the user which may have changed with respect to the original FOV used to select the EFOV frames. The client device may locally generate the FOV frames according to the updated FOV (i.e. the updated orientation data) since the EFOV frames include the extra presentation data. By locally generating the FOV frames, the client device may generate FOV frames according to the updated FOV selected by the user and may therefore compensate for extended RTT and maintain a high QoE even when the RTT is insufficient to do so.

The area size (angular size, i.e. the size of the section on the sphere) of the EFOV frames is set according to typical maximum angular velocity of the client device, i.e. according to the maximum change rate in the FOV selected by the user. Adjusting the size of the EFOV frames allows compensation for the maximal change in the FOV supported by the client device. The area size of the EFOV frames may further be adjusted according to typical latency in the network used for delivering the EVP streams to the client devices.

The third concept is decoupling between the encoding apparatus and the client devices in order to support VR 360 video content delivery to extremely large numbers of client devices. The decoupling is done by configuring the encoding apparatus to generate a plurality of EVP streams from the VR 360 video file such that each of the EVP streams provides a viewport corresponding to a respective one of a plurality of (equally sized) overlapping segments of a sphere defined by the VR 360 video file. Each of the EVP streams corresponds to a respective one of the plurality of overlapping segments constituting the complete sphere defined by the VR 360 video file and comprises a sequence of EFOV frames depicting the respective overlapping segment.

Moreover, the encoding apparatus may transmit the plurality of EVP streams to one or more distribution devices which may each simultaneously serve large numbers of client devices. In particular, the distribution devices may be edge nodes, for example, a server, a computing node and/or the like located at the edge(s) of the network in close communication travel time proximity to the client devices, for example, in close proximity to network gateways serving the client devices.

The distribution device may receive all the EVP streams from the encoding apparatus and may serve each of the client devices with one of the EVP streams selected according to the current orientation data of the respective client device. The orientation data of each client device is analyzed to identify the FOV currently selected by the respective user and the most appropriate EVP stream is delivered to the respective client device. The most appropriate EVP stream is selected to be the EVP stream comprising EFOV frames centered closest to the FOV selected by the respective user. In case of an FOV change of a certain client device (selected by the user) exceeding a certain predefined threshold, the EVP stream delivered to the certain client device may be switched to another EVP stream which is more appropriate, i.e. having EFOV frames centered closer to the center of the newly selected FOV.

Selection of the most appropriate EVP stream for each of the client devices and determining whether to switch to another EVP stream (corresponding to an adjacent overlapping segment) may be conducted by the distribution device(s) analyzing the current orientation data received from the client devices. Additionally and/or alternatively, the selection of the most appropriate EVP stream and/or of switching between EVP streams for one or more of the client devices may be done by the client device(s) themselves. The client device(s) may analyze their current orientation data and may select the most appropriate EVP stream accordingly.

Optionally, the encoding apparatus is configured to generate a plurality of Instantaneous Decoding Refresh (IDR) shifter EVP streams for each viewport, i.e. for each EVP stream. The EVP stream which may be encoded according to one or more video encoding protocols as known in the art may include Groups of Pictures (GOPs) each comprising multiple consecutive frames (e.g., 4 frames, 8 frames, 12 frames, etc.) which may be at least partially interdependent with each other. Each GOP and/or a set of GOPs typically includes an IDR frame indicating the decoder to start decoding from the IDR frame and discard all previously received used reference frames. The encoding apparatus may be configured to generate multiple IDR shifted EVP streams for each viewport, i.e. for each of the plurality of overlapping segments such that each of the IDR shifted EVP streams contains an IDR frame in a successive frame of the GOP. The number of the IDR shifted EVP streams generated for each of the overlapping segments naturally equals the number of frames defined by the video encoding protocol for the GOP.

Optionally, the encoding apparatus dynamically adjusts the size, i.e. the area size of one or more of the EFOV frames according to variations in the QoS, specifically in the RTT measured for data transfer between the encoding apparatus and the distribution device(s) and/or between the distribution device(s) and the client devices. As such, in case the RTT increases, the encoding apparatus may increase the size of the EFOV frame(s) thus providing more extra presentation data that may be used by the client device to compensate for the increased RTT. On the other hand, in case of low RTT, i.e. good QoS, the encoding apparatus may reduce the size of the EFOV frame(s) thus reducing the required network bandwidth and/or the computing resources required to process the smaller EFOV frame(s).

Optionally, the distribution device(s) predicts the current orientation of the client device by analyzing orientation data previously received from the client device. Using the predicted orientation of the client device, the distribution device(s) may select the most appropriate EVP stream comprising EFOV frames with a center shifted according to the predicted orientation. This may significantly increase the accuracy of the EFOV frames selected for the client device and may further provide the extra presentation data in the predicted directions (areas) which may be used by the client device to generate FOV frames and compensate for potentially high RTT.

The distribution device(s) may further utilize a low latency encoder for encoding the EFOV frames transmitted to the client device. Moreover, the server may transmit the EFOV frames to the client device using one or more real time media transfer protocols over one or more ultra-low latency encoder-decoder channels to achieve extremely low latency on the network.

The high throughput VR 360 video content delivery may present significant advantages compared to currently existing methods for delivering VR 360 video content.

First, some of the existing methods may deliver the entire VR 360 content, for example, the VR 360 video file to the client device. This may require significant network resources, specifically network bandwidth which may be limited in practical application thus making such methods impractical. Such methods may further require significantly high computing resources at the client device to process, for example, decode, render and/or generate the FOV frames thus increasing the complexity, cost and/or the like of the client device. The high throughput VR 360 video content delivery on the other hand delivers only a significantly small portion (EFOV frames) of the VR 360 video content thus significantly reducing the required network bandwidth. As the client device processes only the EFOV frames which are significantly small compared to the overall VR 360 video content item, the computing resources required at the client device may be significantly reduced which may significantly reduce complexity, cost and/or the like of the client device.

Some of the existing methods, for example, Facebook Pyramid may deliver multiple viewports and/or profiles of the VR 360 video content. In such methods, the presentation area within the current FOV (FOV frame) is delivered at high resolution while the presentation areas outside the current FOV are delivered in low resolution. However switching between the viewports and/or profiles in response to a change of the FOV as selected by the user may be time consuming and may thus present poor QoE while adjusting to the new FOV and presenting the low resolution content during the switching time. Such methods may have further shortcomings since they may require significant larger storage at the server side for all visual viewport angles (e.g., 6 times the original file size). In addition, more computing resources may be required at the client device for managing the selection of the next viewport to be downloaded according to the viewing angle among the various possible viewports in the surrounding of the current viewing angle.

Other existing methods, for example, Fraunhofer HHI may construct the VR 360 video content as tiles also utilizing multiple viewports and/or profiles of the VR 360 video content. In such methods the network bandwidth efficiency may increase with the number of tiles, where construction of the FOV area by high resolution through smaller tile size reduces the extra area outside the FOV. However, the latency may significantly increase and the QoE may thus deteriorate during FOV change since low resolution (lower quality) is observed until the high resolution stream(s) are downloaded. In addition, smaller tile size may increase the bit-rate for each tile as inter and intra prediction area is reduced. Moreover such methods may require significant computing resources at the client device for both the selection of tiles for the next time interval according to the next viewpoint and the aggregation process that merges individual tile bitstream segments into a viewport dependent bitstream.

In contrast, the high throughput VR 360 video content delivery provides the EFOV frames in high resolution. Moreover, the client device may construct the FOV frames locally using the EFOV frames. Therefore in case of FOV change of the user, the client device may adjust the FOV frame using the extra presentation data available in the EFOV frames to adapt to the new FOV without intervention of the server. In addition, since client device needs to process the EFOV frames which constitute a significantly small portion of the overall VR 360 video content, the computing resources of the client device may be significantly reduced.

Moreover, the plurality of EVP streams correspond to overlapping segments of the sphere defined by the VR 360 video file and the viewports of the EVP streams therefore encompass all viewports of the VR 360 video file. The EVP streams are therefore sufficient for serving any FOV selected by the user of the client device and the number of serviced client devices may be extremely large. The ability to cover any FOV selected by the user may therefore decouple the encoding apparatus from the client devices thus avoiding the need to assign a dedicated encoder for each client device to serve the specific FOV of the respective client device. Moreover, the number of EVP streams required for encompassing the entire sphere may be limited (finite) and relatively small. Generating the finite and relatively small number of EVP streams may significantly reduce the computing resources required by the encoding apparatus to serve large numbers of client devices thus making the high throughput VR 360 video content delivery feasible, cheaper and hence more attractive for adoption in a plurality of content applications, platforms and/or services.

Furthermore, by deploying the distribution device(s) at the edge of the network the QoS may be significantly improved thus reducing the latency, for example, the RTT between the distribution device and the client devices, thus significantly improving the MTP and hence the QoE. Moreover, the efficiency of management of the edge servers and/or of the edge networks may be significantly improved, for example, in terms of one or more Key Performance Indicators (KPI) such as, for example, latency, bandwidth, throughput and/or the like.

In addition, generating the plurality of IDR shifted EVP streams for each viewport (overlapping segment) may significantly improve transition smoothness between EVP streams when a newly selected FOV requires switching of the EVP stream served to a certain client device. By selecting the appropriate IDR shifted EVP stream which has the IDR frame at the location corresponding to the exact time of switching may signal the decoder of the client device to start decoding from scratch and discard all previously used reference frames for decoding current and/or future frames. This may significantly reduce and potentially prevent artifacts resulting from using the reference frames of one EVP stream as reference for decoding another EVP stream thus smoothly transitioning between EVP streams.

Also, by dynamically adapting the size of the EFOV frames according to the RTT, the high throughput VR 360 video content delivery may adjust to variations in the RTT, i.e. in the QoS supported by the network serving the client device.

Lastly, by predicting the current and/or future orientation of the client device(s), i.e. the FOV selected by the user, the EVP streams may be selected according to the predicted orientation. As such the EVP streams may be selected for the respective client devices even before receiving the actual (real) updated orientation data from the client device(s). This may significantly reduce the latency, i.e. the MTP thus significantly improving the QoE.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways as defined in the claims.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
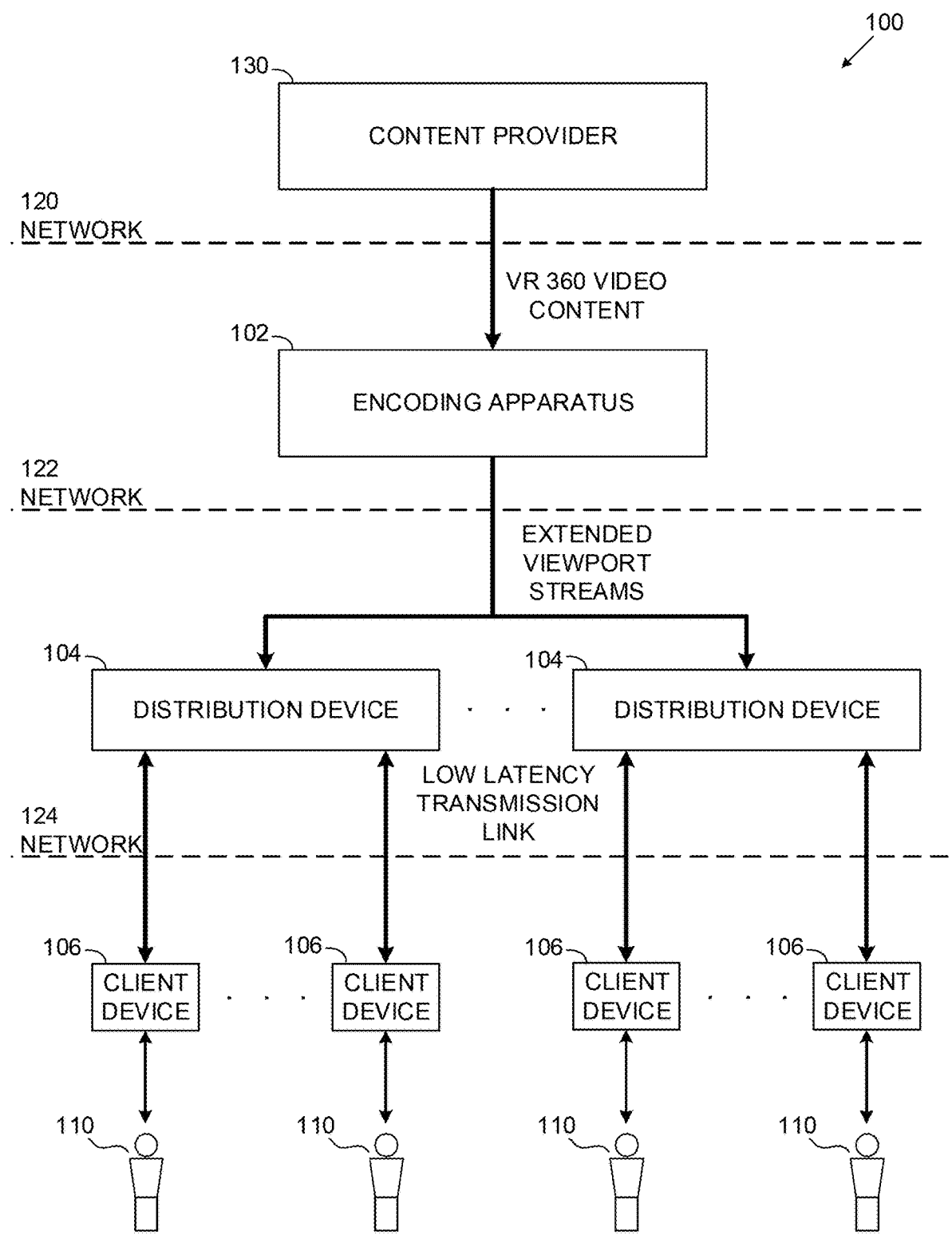
FIG. 1 is a schematic illustration of an exemplary system for delivering VR 360 video content to a plurality of client devices for presentation to respective users, according to some embodiments of the present invention.

Referring now to the drawings, FIG. 1 illustrates a schematic illustration of an exemplary system for delivering VR 360 video content to a plurality of client devices for presentation to respective users, according to some embodiments of the present invention. An exemplary system 100 may include an encoding apparatus 102 for generating a plurality of extended viewport (EVP also referred to as VP+) streams from VR 360 video content received from one or more content providers 130 over a network 120 and transmitting the EVP streams to one or more distribution devices 104 via a network 122. Via another network 124, the distribution device(s) 104 may deliver selected EVP streams to one or more of a plurality of client devices 106 for presentation to respective users 110.

Delivering the VR 360 video content to the plurality of client devices 106, in particular a very large number of client devices 106, may present significant challenges, specifically in terms of network resources, such as bandwidth (throughput) and/or latency. As the VR 360 video content, for example, VR 360 video files and/or the like, in particular high quality (high resolution) and/or high motion VR 360 video content comprises high volumes of data, the network bandwidth needs to be sufficiently high to support the delivery of such large data volumes. In addition, network latency of the network 124 must be sufficiently low to verify user experience of the users 110. The user experience may be expressed, for example, by a Motion to Photon (MTP) latency indicating the latency between a time of a motion (a user 110 selecting an FOV to view the VR 360 video file) and the time of presentation of the respective presentation (photon) presented by the respective client device 106 to the user 110.

The system 100 may address these challenges by splitting the generation of the VR 360 video file presented to the user 110 between the encoding apparatus 102 (server) and each of the client devices 106 as described in International Application No. PCT/EP2017/084477, entitled "Enabling the Adoption of VR 360 Video for Remote End Users" filed Dec. 22, 2017, the contents of which are incorporated herein by reference in their entirety.

As described in PCT/EP2017/084477, splitting the VR 360 video file processing and/or generation between the encoding apparatus 102 and each client device 106 is based on the fact that at any given time each client device 106 presents to the respective user 110 only a significantly small segment of a sphere defined by the VR 360 video file. As such the encoding apparatus may generate (render) viewport stream(s) presenting only relevant segments cropped from the VR 360 video and transmit the viewport stream(s) to the client device(s) 106 over the network. The encoding apparatus 102 may select the cropped segments of the VR 360 video file according to orientation data received from the client device(s) 106 which indicates the current orientation of the client device 106 which represents the Field of View (FOV) selected by the user 110 to view the VR 360 video presentation.

The split implementation may significantly reduce the network bandwidth required for delivering the VR 360 video to the client device(s) 106 since only significantly small segments of the overall VR 360 video file are transmitted (streamed) to the client device(s) 106. Moreover, the split implementation may significantly reduce the computing resources required at each client device 106 for processing the VR 360 video, for example, decoding, rendering, generating and/or the like since only a small segment of the VR 360 video file is processed by each client device 106.

Naturally, one or more of the users 110 may change the selected FOV, for example, change a location of the center of FOV, increase the FOV (zoom-out), decrease the FOV (zoom-in) and/or the like. The cropped segment of the VR 360 video may therefore need to be updated accordingly, i.e. the encoding apparatus 102 may need to generate new VR 360 video segments for the client device(s) 106 reflecting the new FOV(s). In order to maintain a sufficiently high user experience the latency of the network may be compensated by locally adjusting the segment of the VR 360 video at the client device(s) 106. To support this, the EVP streams generated by the encoding apparatus 102 for the cropped segment(s) of the VR 360 video include Extended FOV (EFOV, also referred to as FOV+) frames which encompass a larger FOV area than the FOV area presented to the user(s) 110 by the client device(s) 106. The EFOV frames thus comprise additional presentation data compared to their respective FOV frames presented by the client device(s) 106. The additional presentation data may serve as a buffer which may be used by the client device(s) 106 to locally generate updated FOV frames according to updated orientation data of the client device. The FOV frames may then be presented to the user(s) 110. As such the additional (extra) area of the EFOV frames compared to the FOV frames may practically be used to compensate for the latency in the network 124. This may significantly reduce and/or completely avoid the need of the client device(s) 106 to wait for new EFOV frames created by the encoding apparatus 102 in response to orientation change(s) of the client device(s) 106. i.e. according to the updated orientation data.

Figure 2:
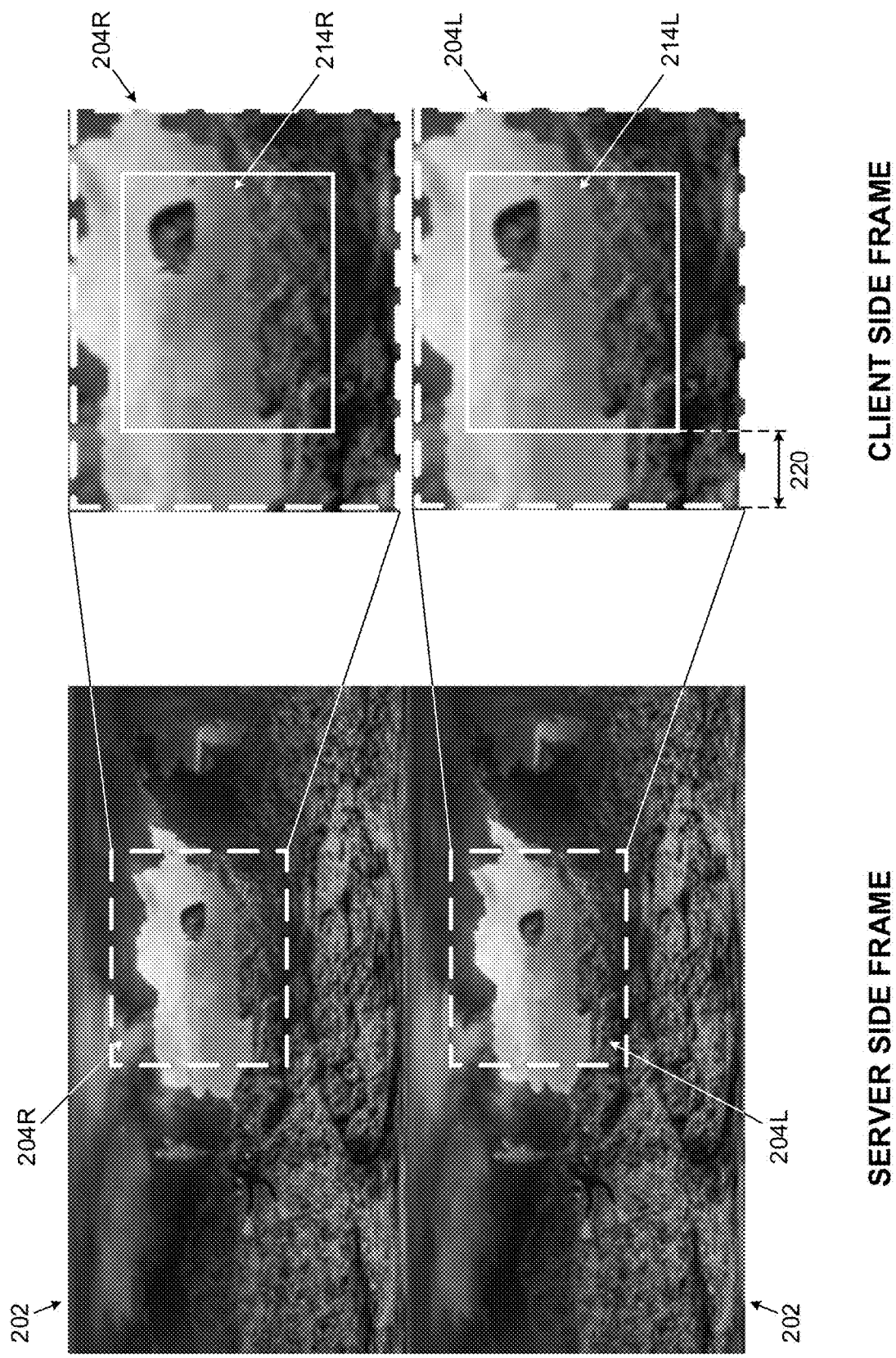
FIG. 2 is a schematic illustration of an exemplary VR 360 video frame generated from a respective Extended Field Of View (EFOV) frame, according to some embodiments of the present invention.

Reference is now made to FIG. 2, which is a schematic illustration of an exemplary VR 360 video frame generated from a respective EFOV frame, according to some embodiments of the present invention. An exemplary VR 360 video 202 may be processed, for example, cropped, rendered and/or the like by an encoding apparatus such as the encoding apparatus 102. The encoding apparatus 102 processes the VR 360 video 202 according to the one or more predefined client device presentation capabilities of one or more client devices such as the client devices 106. In the presented example, the client device 106 may be, for example, an HMD, a stereoscopic goggles and/or the like supporting 3D presentation. The encoding apparatus 102 may therefore generate two EFOV frames 204R and 204L where the EFOV frames 204R is adapted for a right eye presentation at a display of the client device 106 and the EFOV frames 204L is adapted for a left eye presentation at the display of the client device 106. The client device 106 may further process, for example, crop, render and/or the like the received EFOV frames 204R and 204L to generate respective FOV frames 214R and 214L according to updated orientation data indicating a change in the orientation of the client device 120. As evident, the EFOV frame 204 (e.g., 204R and 204L) includes an exemplary one-side extra area 220 compared to the respective FOV frame 214 (e.g., 214R and 214L).

The angular size of the EFOV frame 204 is therefore the angular size of the FOV frame with the one-side extra area 220 added at each side of the FOV frame 204 in both the longitudinal axis and in the latitudinal axis.

The (angular) size of the FOV depicting the respective overlapping segment 304 of the sphere 302 may depend on the type of projection format selected for delivery to the client device 106. The projection format may include, for example, equirectangular projection (ERP), rectilinear projection, cubemap (CMP), equal-area (EAP), octahedron (OHP), Platonic Solid Projection (PSP) and/or the like. While the ERP projection format is presented herein after, it should not be construed as limiting since other projection formats may be used.

The one sided extra area 220 of the EFOV frame 204 may be designated by $\text{Diff}_{Size}$. The maximum time delay that may be compensated for with the presentation data of $\text{Diff}_{Size}$ is designated $T_{comp}$. The relation between $\text{Diff}_{Size}$ and $T_{comp}$ may be used to define the $\text{Diff}_{Size}$ according to a given Round Trip delay Time (RTT) of the video delivery to the client device 106. The $\text{Diff}_{Size}$ may further be adjusted according to capabilities of the client device 106, for example, supporting a 2D presentation/3D presentation, display size, display resolution and/or the like.

The time delay $T_{comp}$ may thus be defined by the maximum allowed latency that may be compensated by the presentation data of the extra area $\text{Diff}_{Size}$ for a given maximum angular velocity of the client device 106 as presented in equation 1 below.

$$T_{comp} = \frac{Diff_{Size}[deg]}{MxAnS[deg/\text{ms}]} \qquad \text{Equation 1}$$

Where $\text{Diff}_{Size}$ [deg] is the one-side extra area 220 in each EFOV frame 204 and MxAnS [deg/ms] is the maximum angular velocity.

For example, assuming 10 degrees extra in each direction, i.e. $\text{Diff}_{Size}=10°$, and MxAnS=1.0°/ms, $$T_{comp} = \frac{10°}{1.0°/\text{ms}} = 10 \text{ ms.}$$

In such case an RTT of 10 ms may be compensated for by the client device 106 using the presentation data of the extra area 220 of the EFOV frame 204.

In another example, assuming a 10 degrees extra area in each direction, i.e. Diff$_{Size}$=10° and MxAnS=0.2°/ms, $$T_{comp} = \frac{10°}{0.2°/ms} = 50 \text{ ms}.$$

In such case an RTT of 50 ms may be compensated for by the client device 106 using the presentation data of the extra area of the EFOV frame.

However, the splitting implementation as described in PCT/EP2017/084477, implies a close coupling between the encoding apparatus 102 (server) and each of the plurality of client devices 106 since a dedicated encoder needs to be assigned at the encoding apparatus 102 for each of the client devices 106 in order to generate the appropriate EVP for each of the client devices 106. This may present a major limitation, specifically when the number of client devices 106 is extremely large (e.g., 50,000) thus significantly increasing the computing resources required by the encoding apparatus 102, for example, computing power, storage capacity and/or the like. Moreover, the close coupling and the multitude of encoders at the encoding apparatus 102 may significantly increase latency in delivery of the EVPs to the client devices 106 which may significantly impact the user experience of the users 110.

According to some embodiments of the present invention, the encoding apparatus 102 is decoupled from the client devices 106. The encoding apparatus 102 may be adapted to segment the sphere defined by the VR 360 video file to a plurality of overlapping segments (each corresponding to a viewport of the VR 360 video file) and generate a plurality of EVP streams each for a respective one of the overlapping segments. The encoding apparatus may deliver the EVP streams generated for the plurality of overlapping segments to the distribution devices 104 which may each serve a plurality of client devices 106.

For each of the client devices 106 requesting to consume the VR 360 video file, the respective distribution device 104 may transmit a selected one of the plurality of EVP streams according to the current orientation data received from the respective client device 106 where the current orientation data indicates the current FOV of the presentation of the VR 360 video file at the client device 106. The distribution device 104 may therefore select to serve each client device 106 with the EVP stream comprising EFOV frames depicting the overlapping segment corresponding to the FOV of the respective client device 106. In case the current orientation data received from a certain client device 106 indicates the FOV of the certain client device corresponds to an adjacent overlapping segment, the distribution device 104 may select to serve the certain client device 106 with another EVP stream comprising EFOV frames depicting the adjacent overlapping segment.

Figure 3A:
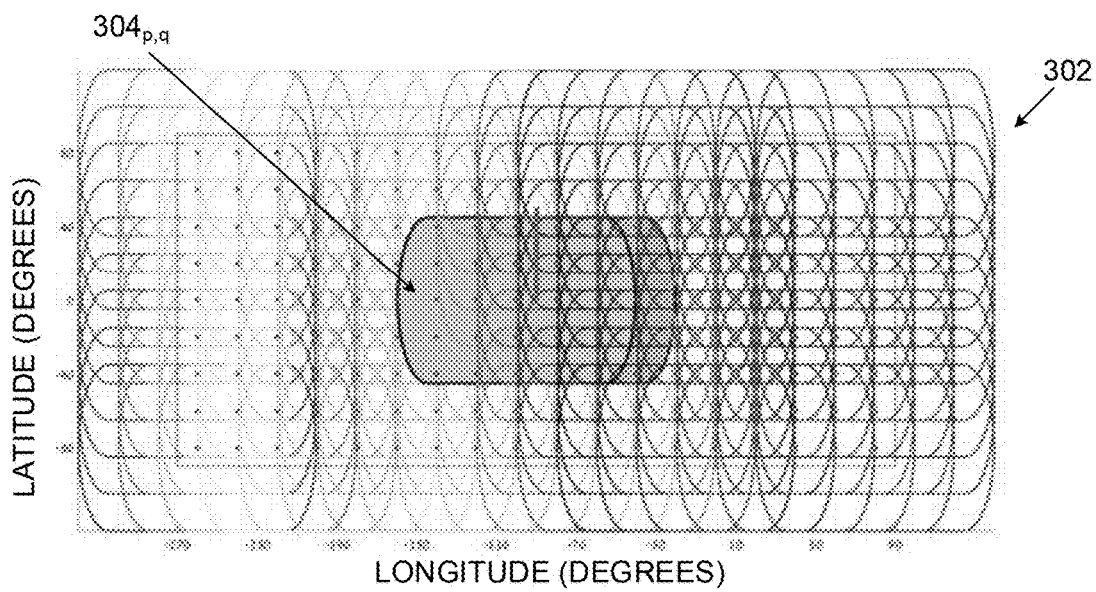
FIG. 3A, FIG. 3B and FIG. 3C are schematic illustrations presenting segmentation of a presentation sphere defined by a VR 360 video file, according to some embodiments of the present invention.
Figure 3B:
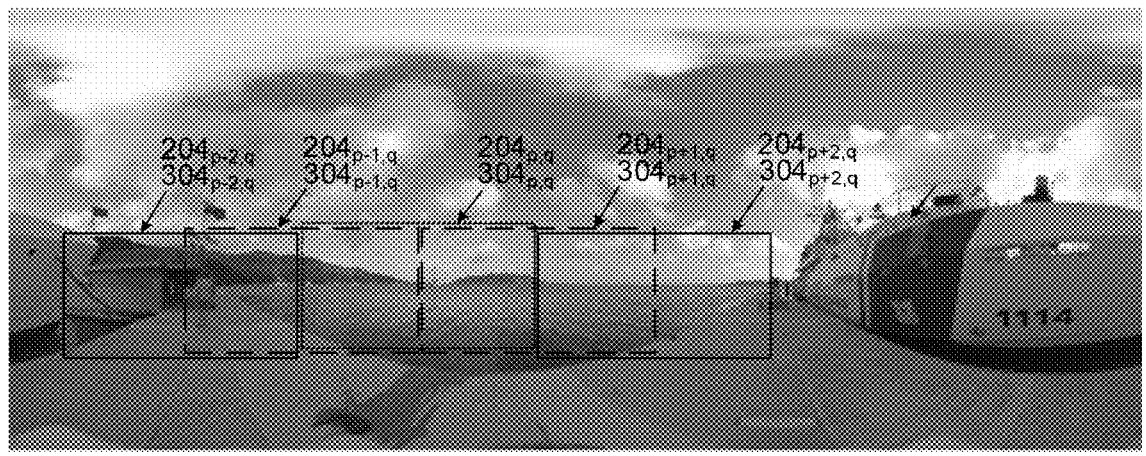
Figure 3C:
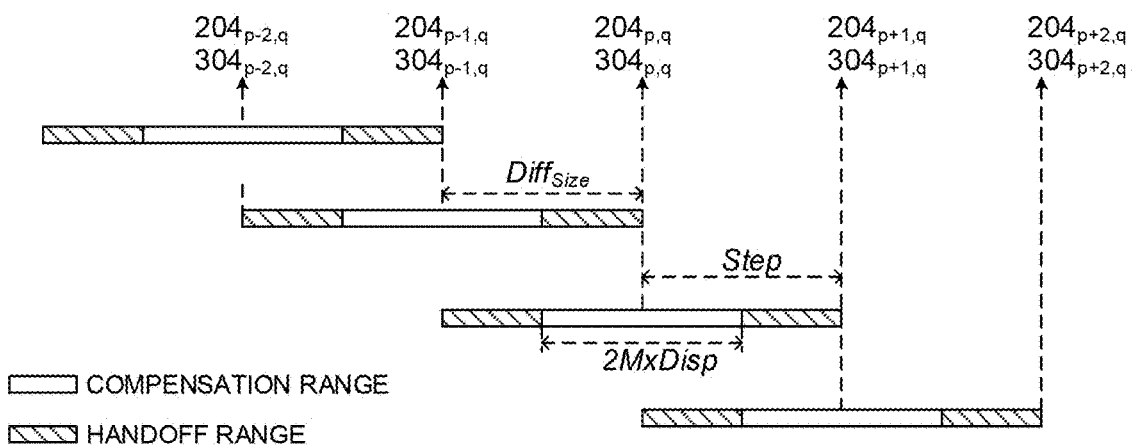

Reference is now made to FIG. 3A, FIG. 3B and FIG. 3C, which are schematic illustration presenting segmentation of a presentation sphere defined by a VR 360 video file, according to some embodiments of the present invention.

As shown in FIG. 3A, an exemplary sphere 302 defined by a VR 360 video file projected in a planar projection is segmented to a plurality of overlapping segments 304 such that each overlapping segment $304_{p,q}$ has an overlapping area with each of its adjacent overlapping segments. The sphere 302 is segmented, for example, to 18×9 overlapping segments 304 such that each of the overlapping segments 304 shifted by 20° (degrees) captures a respective section of the sphere 302.

As shown in FIG. 3B, each of the overlapping segments, for example, overlapping segments $304_{p-2,q}$, $304_{p-1,q}$, $304_{p,q}$, $304_{p+1,q}$ and $304_{p+2,q}$ has an overlapping area with its adjacent overlapping segments 304. For example, the overlapping segment $304_{p-2,q}$ has an overlapping area with the overlapping segment $304_{p-1,q}$, the overlapping segment $304_{p+1,q}$ has an overlapping area with the overlapping segments $304_{p-2,q}$ and $304_{p,q}$, the overlapping segment $304_{p,q}$ has an overlapping area with the overlapping segments $304_{p-1,q}$ and $304_{p+1,q}$, the overlapping segment $304_{p+1,q}$ has an overlapping area with the overlapping segments $304_{p,q}$ and $304_{p+2,q}$ and so on.

While the overlapping areas of the overlapping segments $304_{p-2,q}$, $304_{p-1,q}$, $304_{p,q}$, $304_{p+1,q}$ and $304_{p+2,q}$ are presented in the longitude (horizontal) axis, the same overlapping areas are applied for the latitude (vertical) axis such that each of the overlapping segments 304 has an overlapping area with each of its adjacent overlapping segments 304 in the longitude and in the latitude directions.

The encoding apparatus 102 creates an EVP stream for each of the overlapping segments 304 where the EVP stream comprises a sequence of EFOV frames capturing the respective overlapping segment 304 in a certain time instance.

The size of the overlapping segments 304 therefore reflects the size of the EFOV frames 204 and the two terms—the EFOV frame 204 and the overlapping segment 304, specifically in terms of their size may be interchangeable throughout this document. For Example, an EFOV frame $204_{p-2,q}$ is created for the overlapping segments $304_{p-2,q}$, an EFOV frame $204_{p-1,q}$ is created for the overlapping segments $304_{p-1,q}$, an EFOV frame $204_{p,q}$ is created for the overlapping segments $304_{p,q}$, an EFOV frame $204_{p+1,q}$ is created for the overlapping segments $304_{p+1,q}$, an EFOV frame $204_{p+2,q}$ is created for the overlapping segments $304_{p+2,q}$ and so on.

FIG. 3C presents a longitude axis of the some exemplary overlapping segments 304, specifically the overlapping segments $304_{p-2,q}$, $304_{p-1,q}$, $304_{p,q}$, $304_{p+1,q}$ and $304_{p+2,q}$ corresponding to the respective EFOV frames $204_{p-2,q}$, $204_{p-1,q}$, $204_{p,q}$, $204_{p+1,q}$ and $204_{p+2,q}$. The size of the overlapping segments 304 as well as the overlapping area with the adjacent overlapping segments 304 is predefined according to the segmentation parameters which reflect the operational parameters of the transmission of the EVP streams to client devices such as the client devices 106. The operational parameters used for segmenting the sphere of the VR 360 video file to the plurality of overlapping segments 304 may typically be derived from operational parameters relating to the client devices, for example, an angular displacement of a display such as the display 430 of the client devices 106, a latency of the network 124 (expressed for example, by the RTT of the video delivery to the client devices 106) and/or the like.

As described herein before, the presentation data of the additional (extra) area of the EFOV frames may be used by the client device(s) 106 to generate the FOV frames 214 from the EFOV frames 204 of the received EVP stream. Since the EFOV frame 214 is larger than the FOV frame 204, the client device(s) 106 may generate the FOV frame 214 from the EFOV frame 204 according to updated orientation data indicating an update to the FOV center selected by the user 110 compared to the FOV center of the EFOV frame 204. Since the update to the FOV may take place after the EVP stream is transmitted to the client device(s) 106, the client device(s) 106 may practically compensate for the latency of the network 124 by using the additional (extra) area of the EFOV frames 214 to generate the FOV 204 according to the updated FOV.

To efficiently serve as a buffer for compensating for the network latency of the network 124 while supporting the FOV updates, segmenting the sphere 302 is done according to the size of the EFOV frames 204 which may be defined according to a maximum FOV change rate, i.e. orientation change rate of the client device 106, typically with respect to the latency over the network 124.

The maximum FOV change rate (displacement) may be expressed by MxDisp indicating the maximal angular displacement of the FOV (orientation) as presented in equation 1 below.

$$MxDisp[deg] = \frac{MxAnS[deg/s]}{fps[frames/s]} \quad \text{Equation 1}$$

Where MxAnS [deg/ms] is the maximum angular velocity of the client device 106, i.e. the maximal orientation change rate and fps is the frame rate (frames per second) of the VR 360 video file.

As described herein before, the angular size of the EFOV frame 204 is the angular size of the FOV frame 204 plus the extra area 220, $\text{Diff}_{Size}$, in each side (longitudinal and latitudinal). An angular Step is defined between centers of adjacent EFOV frames 204 and hence between centers of adjacent overlapping segments 304.

For example, considering the longitudinal axis, assuming MxAnS=300°/s and fps=30 frames/s, the maximum angular displacement is MxDisp=10°. The extra size in each direction of the FOV frame can be expressed as $$\text{Diff}_{Size} = MxDisp + \frac{\text{Step}}{2}.$$

Assuming Step=$\text{Diff}_{Size}$, the size of the extra EFOV frame 204 is therefore $\text{Diff}_{Size}$=2×MxDisp=20°. The 2×MxDisp area may be regarded as a compensation range which may be used by one or more of the client devices 106 to generate a FOV frame 214 from the EFOV frame 204 according to the updated FOV center which may have changed compared to the FOV center of the received EFOV frame 214.

The overlapping area defined for each pair of adjacent overlapping segments 304 may be defined to assure smooth switching between EVP streams served to the client device(s) 106 when changing the FOV. For example, the overlapping area expressed by the angular Step may be set to Step=$\text{Diff}_{Size}$=20°. A handoff range may be defined such that when the FOV selected by the user 110 and expressed by the current orientation of the client device 106 enters the handoff range, the EVP stream served to the client device 106 may be switched to the adjacent EVP stream in the direction of the handoff range.

Segmentation of the sphere 302 therefore relies on the values of the size of the EFOV frame 204 and the Step. To continue the previous example, assuming the size of the extra area of EFOV frame 204 is $\text{Diff}_{Size}$=20° and the Step is 20°, the sphere 302 may be segmented to 18×9 overlapping segments 304 as presented in FIG. 3A such that each of the overlapping segments shifted by 20° (degrees) captures a respective section of the sphere 302, i.e., FOV+/−20° in each direction.

Figure 4A:
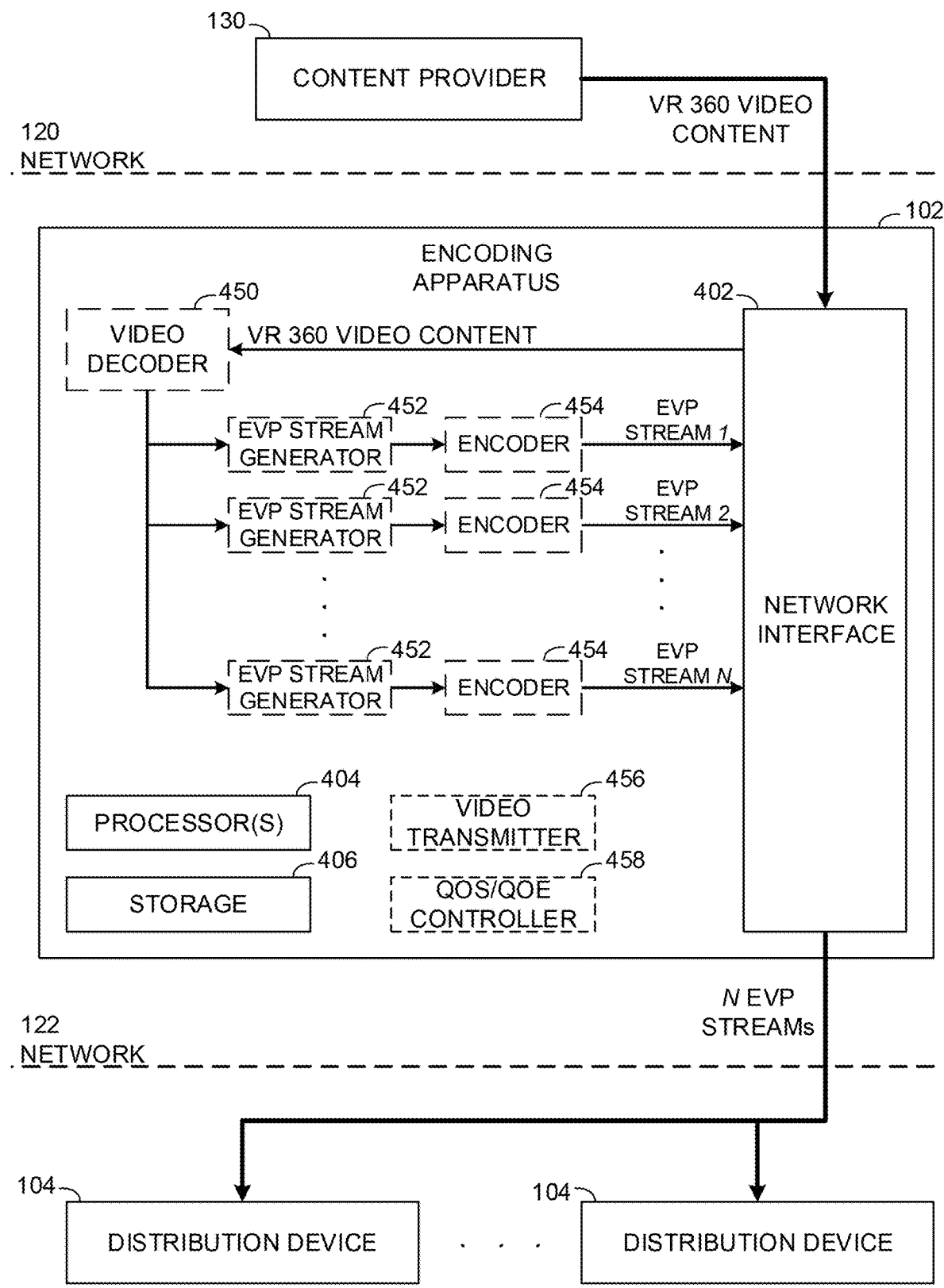
FIG. 4A, FIG. 4B and FIG. 4C are schematic illustrations of exemplary system elements for delivering VR 360 video content to a plurality of client devices for presentation to respective users, according to some embodiments of the present invention.
Figure 4B:
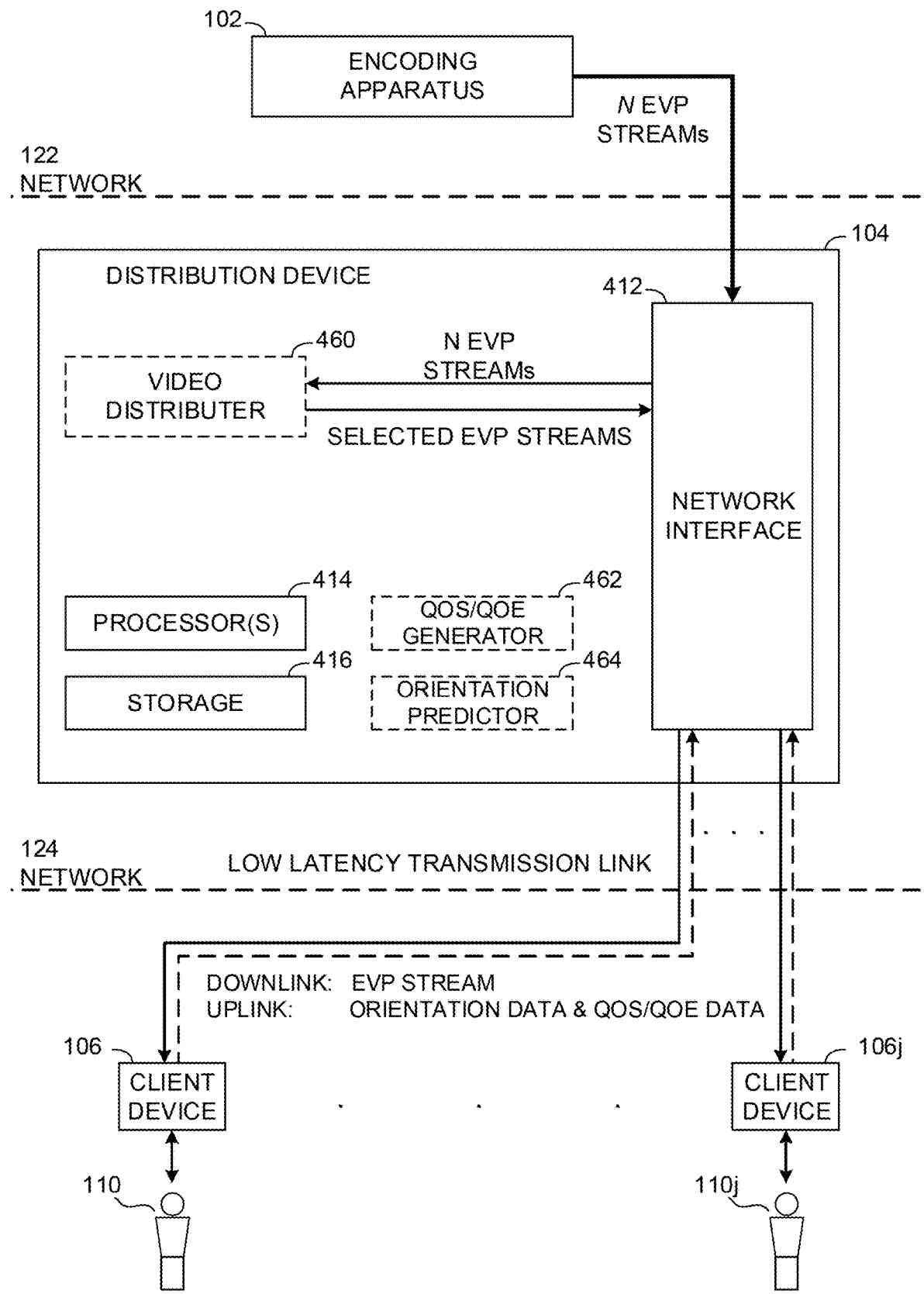
Figure 4C:
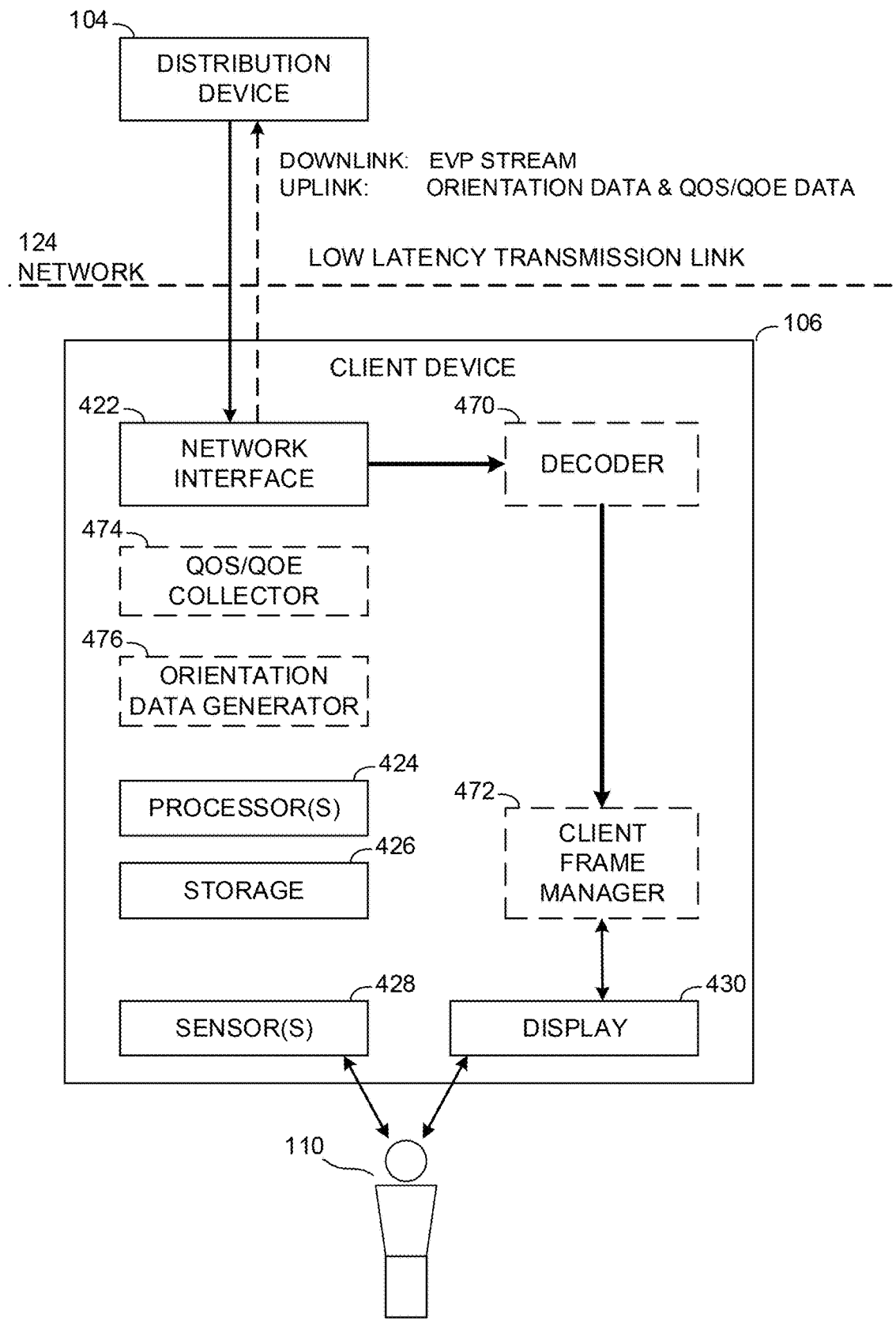

Reference is now made to FIG. 4A, FIG. 4B and FIG. 4C, which are schematic illustrations of exemplary elements of the system 100 for delivering VR 360 video content to a plurality of client devices for presentation to respective users, according to some embodiments of the present invention.

As shown in FIG. 4A, an encoding apparatus such as the encoding apparatus 102, for example, a server, a computing node, a cluster of computing nodes and/or any processing device having one or more processors comprises a network interface 402, a processor(s) 404 and a storage 406. In some embodiments of the present invention, the encoding apparatus 102 may be provided through one or more cloud computing services, platform and/or resources, such as, for example, proprietary server, IBM uCloud, Amazon Web Service (AWS), Google Cloud, Microsoft Azure and/or the like.

The network interface 402 may comprise one or more network interfaces for connecting to one or more wired and/or wireless networks, for example, a Local Area Network (LAN), a Wide Area Network (WAN), a Metropolitan Area Network (MAN), a cellular network, the internet and/or the like. For example, using the network interface 402, the encoding apparatus 102 may connect to the network 120 which may comprise one or more networks for communicating with one or more of the content providers 130. In another example, using the network interface 402, the encoding apparatus 102 may connect to the network 122 which may comprise one or more networks for communicating with one or more of the distribution devices 104.

Optionally, the networks 120 and 122 are joined such that the encoding apparatus 102 may communicate with both the content provider(s) 130 and the distribution device(s) 104 via the same network.

The processor(s) 404, homogenous or heterogeneous, may include one or more processors arranged for parallel processing, as clusters and/or as one or more multi core processor(s).

The storage 406 may include one or more non-transitory persistent storage devices, for example, a hard drive, a Flash array and/or the like. The storage 406 may also include one or more non-transitory volatile devices, for example, a Random Access Memory (RAM) component and/or the like. The storage 406 may further comprise one or more network storage devices, for example, a storage server, a network accessible storage (NAS), a network drive, and/or the like.

The encoding apparatus 102, specifically the processor(s) 404 may execute one or more software modules, for example, a process, an application, an agent, a utility, a script, a plug-in and/or the like, wherein a software module may comprise a plurality of program instructions executed by a processor such as the processor(s) 404 from a storage such as the storage 406.

The encoding apparatus 102 may execute one or more operational modules, for example, a video decoder 450, a plurality of EVP generators 452, a plurality of video encoders 454, a video transmitter 456, a Quality of Service (QOS)/Quality of Experience (QOE) controller 458 and/or the like implemented by means of one or more hardware elements, one or more software modules and/or a combination thereof. The hardware elements may include, for example, a circuit, a component, an Integrated Circuit (IC) and/or the like. The hardware elements may further include one or more application specific components, for example, an Application Specific Integrated Circuit (ASIC), a Field Programmable Gate Array (FPGA), a Digital Signals Processor (DSP), a Graphic Processing Units (GPU) and/or the like.

The video decoder 450 may decode the VR 360 video content, for example, the VR video file obtained from the content provider(s) 130. The video decoder 450 may be adapted to support one or more of a plurality of encoding protocols, specifically video encoding protocols, for example, MPEG. H.264, H.265. H.266 and/or the like.

The plurality of EVP stream generators 452 may each render a respective overlapping segment of the VR 360 video file to generate a respective EVP stream of a plurality (e.g., N) EVP streams each encoded by a respective one of the plurality of encoders 454. Each of the EVP stream generators 452 may generate the EFOV frames for the respective EVP stream depicting the respective overlapping segment of the sphere defined by the VR 360 video file. Each of the encoders 454 may encode the respective EVP stream according to one or more of the video encoding protocols such as, for example, MPEG, H.264, H.265, H.266 and/or the like.

The video transmitter 456 may operate the network interface 402 to transmit the N encoded EVP streams to the distribution device(s) 104.

The QOS/QOE controller 458 may collect, analyze and/or calculate QoS/QoE data relating to the VR 360 video session which may be indicative of a latency, specifically an RTT of the EVP streams delivery (transmission) to the distribution device(s) 104 and/or to the client devices 106.

As shown in FIG. 4B, a distribution device such as the distribution device 104, for example, a server, a computing node, a cluster of computing nodes and/or any processing device having one or more processors comprises a network interface 412, a processor(s) 414 and a storage 416.

The network interface 412 such as the network interface 402 may comprise one or more network interfaces for connecting to the network 122 to communicate with the encoding apparatus 102. Using the network interface 412, the distribution device 104 may connect to the network 124 which may comprise one or more networks for communicating with the plurality of client devices 106.

In particular, the network 124 may support low latency transmission links between the distribution device 104 and the client devices 106. For example, the distribution device 104 may be an edge node located at the edge of the network 124 in close communication travel time proximity to the client devices 106, specifically in close proximity to network gateways serving the client devices 106. Such deployment of the server 102 may significantly reduce the latency, i.e. the travel time of data messages and packets exchanged between the distribution device 104 and the client devices 106. This deployment may also significantly reduce the network bandwidth, i.e. utilization of the network 124 for exchanging the VR 360 video content and associated data between the distribution device 104 and the client devices 106.

The processor(s) 414 such as the processor(s) 404 may execute one or more software modules, for example, a process, an application, an agent, a utility, a script, a plug-in and/or the like, wherein a software module may comprise a plurality of program instructions executed by a processor such as the processor(s) 414 from a storage such as the storage 316.

The storage 416 such as the storage 406 may include one or more non-transitory persistent storage devices and/or one or more volatile devices. The storage 416 may further comprise one or more network storage devices.

The distribution device 104 may execute one or more operational modules, for example, a video distributer 460, a QOS/QOE generator 462, an orientation predictor 464 and/or the like implemented by means of one or more hardware elements, one or more software modules and/or a combination thereof. The hardware elements may include, for example, a circuit, a component, an IC and/or the like. The hardware elements may further include one or more application specific components, for example, an ASIC, an FPGA, a DSP, a GPU and/or the like.

The video distributer 460 may select a respective one of the EVP streams received from the encoding apparatus 102 for transmission to each of the client devices 106, specifically according to the orientation data received from each of the client devices 106.

The QOS/QOE controller 462 may generate QOS/QOE data which may be indicative of the latency, specifically the RTT of the EVP streams delivery to the distribution device(s) and/or to the client devices 106.

The orientation predictor 464 may predict orientation changes (updates) of one or more of the client devices 106 based on previous orientation data received from the client devices 106.

As shown in FIG. 4C, a client device such as the client device 106, for example, a desktop computer, a laptop computer, a mobile device (e.g., a Smartphone, a tablet, etc.), an HMD, a stereoscopic goggles and/or the like may comprise a network interface 422 such as the network interface 402 for connecting to the network 124, a processor(s) 424, a storage 426, one or more sensors 428 and a display 430.

The storage 426 may include one or more non-transitory persistent storage devices, for example, a hard drive, a Flash array and/or the like and/or one or more volatile devices, for example, a RAM component and/or the like.

The display 430 may support 2D presentation and/or 3D presentation to the user 110. For example, a client device 106 such as the HMD, the stereoscopic goggles and/or the like may typically include a 3D display (screen) supporting the 3D presentation and optionally the 2D presentation. In another example, a client device 106 such as a desktop computer, laptop computer, Smartphone, tablet and/or the like may typically include a flat 2D display (screen) supporting the 2D presentation.

The sensor(s) 428 may be adapted to monitor and capture the current orientation of the client device 106 and provide sensory data accordingly. The orientation of the client device 106 is typically indicative of the FOV selected by the user 110 for the presentation of the VR 360 video file on the display 430. The type, functionality, characteristics and/or the like of the sensor(s) 428 may naturally depend on the type and nature of the client device 106. For example, for the client device 106 such as a HMD, the stereoscopic goggles and/or the like, the sensor(s) 428 may include, for example, an accelerometer, a gyroscope, an Inertial Measurement Unit (IMU), a laser position sensor, an imaging sensor and/or the like adapted to monitor and capture gestures of the user, for example, head gestures, hand(s) gestures, bodily gestures/movements and/or the like which may indicate the orientation of the client device 106 as selected by a user 110. In another example, for the client device 106 such as a desktop computer, a laptop computer, a Smartphone, a tablet and/or the like, the sensor(s) 428 may include, for example, an accelerometer, a gyroscope, an IMU and/or the like adapted to monitor and capture the orientation of the client device 106. For such client devices 106, the sensor(s) 428 may further be utilized by a pointing device or mechanism, for example, a mouse, a touchpad, a touchscreen and/or the like through which the user 110 may select the orientation of the VR 360 video presentation. For example, the user 110 may operate the touchscreen with his hands and/or fingers to select the FOV for the presentation of the VR video file.

The processor(s) 424 such as the processor(s) 404 may execute one or more software modules, for example, a process, an application, an agent, a utility, a script, a plug-in and/or the like, wherein a software module may comprise a plurality of program instructions executed by a processor such as the processor(s) 424 from a storage such as the storage 426.

The client device 106 may execute one or more operational modules, for example, a decoder 470, a client frame generator 472, a QOS/QOE collector 474, an orientation data generator 476 and/or the like implemented by means of one or more hardware elements, one or more software modules and/or a combination thereof. The hardware elements may include, for example, a circuit, a component, an IC and/or the like. The hardware elements may further include one or more application specific components, for example, an ASIC, an FPGA, a DSP, a GPU and/or the like.

The decoder 470 may decode the EVP stream received from the distribution device 104. The decoder 470 may be adapted to support one or more of the encoding protocols, specifically the video encoding protocols, for example, MPEG, H.264, H.265, H.266 and/or the like.

The client frame generator 472 may process the EFOV frames extracted from the decoded EVP stream to generate the FOV frame for presentation on the display 430.

The QOS/QOE data collector 474 may collect the QOS/QOE data relating to the VR 360 video session, specifically the EVP stream received from distribution device 104. For example, the QOS/QOE data collector 474 may identify latency of traffic on the network 124 between the distribution device 104 and the client device 106 by analyzing time stamps associated with the EFOV frames. The QOS/QOE data collector 474 may further identify the MTP (indicative of the QoE) by analyzing time stamps of the orientation data used to select the received EVP stream which may be embedded in the received EVP stream.

The orientation data generator 476 may collect the sensory data from the sensor(s) 428 and generate the orientation data for the client device 106.

Figure 5:
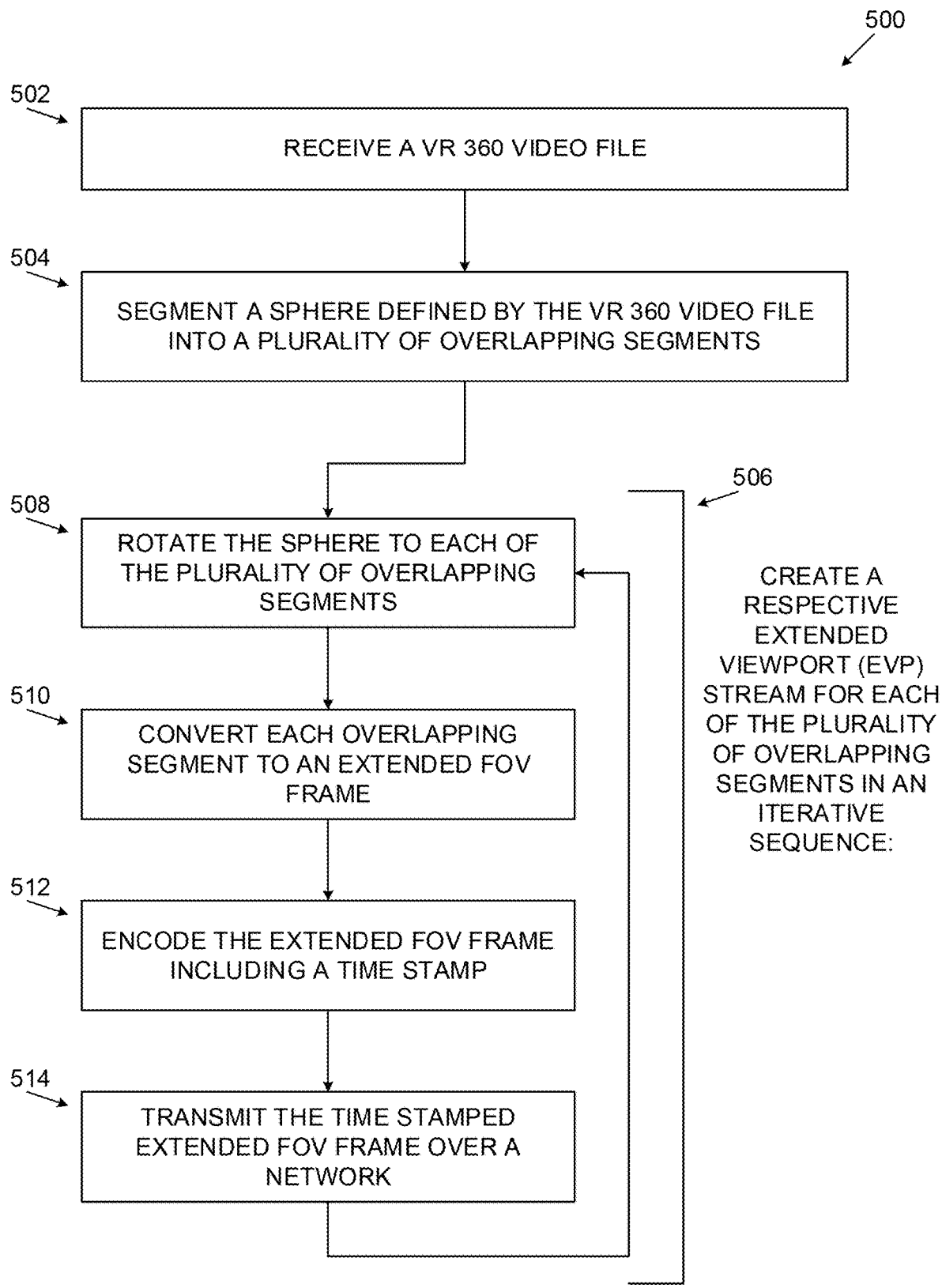
FIG. 5 is a flowchart of an exemplary process executed by an encoding apparatus for creating a plurality of Extended Viewport (EVP) streams from a VR 360 video file, according to some embodiments of the present invention.

Reference is now made to FIG. 5, which is a flowchart of an exemplary process executed by an encoding apparatus such as the encoding device 102 for creating a plurality of Extended Viewport (EVP) streams from a VR 360 video file, according to some embodiments of the present invention.

As shown at 502, the process 500 starts with the encoding apparatus 102 receiving VR 360 video content defining a 360 presentation sphere from one or more content providers such as the content provider, for example, a Content Delivery Network (CDN), a data center, a content provider origin server and/or the like 130 via a network such as the network 120.

A video decoder such as the video decoder 450 executed by the encoding apparatus may decode the VR 360 video file which may be encoded using one or more video encoding protocols such as, for example, MPEG, H.264, H.265, H.266 and/or the like. The VR 360 video file received (downloaded) from the content provider 130 may optionally be locally stored in the encoding apparatus 102, for example, in storage such as the storage 406.

The video decoder 450 may drive the decoded VR 360 video file to a plurality of EVP stream generators such as the EVP stream generators 452. While the video decoder 450 may drive the entire VR 360 video file to one or more of the EVP stream generators 452, the video decoder 450 may optionally provide only relevant portions of the VR 360 video file to one or more of the EVP stream generators 452 where the relevant portions comprise the segments of the VR 360 video file sphere required by the EVP stream generator(s) 452 for generating the respective EVP stream as described herein after.

As shown at 504, a sphere such as the sphere 302 defined by the decoded VR 360 video file is segmented to a plurality of equally sized overlapping segments to create a plurality of corresponding viewports. The segmentation may be done according to a predefined segmentation scheme defined by one or more segmentation parameters as described herein above for FIG. 2 and FIGS. 3A-3C. Specifically the sphere is segmented to the plurality of overlapping segments according to the maximum angular displacement MxDisp derived from the maximum angular velocity MxAnS of the client devices 106.

As described herein above, segmenting the sphere to the plurality of (equal size) overlapping segments is done according to the (angular) size defined for the EFOV frames, for example, an EFOV_width and an EFOV_height. The EFOV_width and the EFOV_height may be defined according to:

Values of the FOV frame, for example, FOV angles, i.e. a horizontal FOV angle value and a vertical FOV angle value.

Dimensions of the EFOV frames to be produced from each overlapping segment 304 of the sphere, i.e. the size of the FOV frame added with the size of the extra areas added at each side of the FOV frame ($2 \times \text{Diff}_{Size}$) in the longitudinal axis and in the latitudinal axis.

After segmenting the sphere, each of a plurality of EVP stream generators such as the EVP stream generator 452 is assigned with a respective one of the plurality of overlapping segments 304.

Following the example presented for FIG. 2 and FIGS. 3A-3C, the number spatial N of EVP streams is 18×9=162 where the step between the centers of the overlapping segments is 20°.

The process 500 may include a plurality of iterations 506 in which each of the EVP stream generators 452 coupled with its respective encoder such as the encoder 454 repeats steps through 514 to create a respective one of the plurality of EVP streams corresponding to the overlapping segment 304 assigned to the EVP stream generator 452. The iterative process is described hereinafter for a single EVP stream generator 452; however, the same iterative process may be executed, optionally simultaneously, by the plurality of EVP stream generators 452 each processing its respective overlapping segment to generate its respective EVP stream.

As part of the segmentation, grid points (m, n) of each of the plurality of overlapping segments may be generated. The grid points (m, n) may be stored in a global dataset, for example, a file, a table, a list and/or the like mapping each of the plurality of overlapping segments to the respective coordinates in the sphere. Optionally, the respective grid points (m, n) of one or more of the overlapping segments are included, for example, as metadata and/or the like in the respective EFOV frames and/or in the respective EVP stream generated for the respective overlapping segment.

As shown at 508, the EVP stream generator 452 may rotate the sphere to align the sphere according to its assigned overlapping segment.

The EVP stream generator 452 may project the grid points (m, n) of its respective overlapping segment on the sphere of the VR 360 video file as follows: (m, n)→(u, v)→(φ, θ)→X', Y', Z'.

Where, (m, n) is the column and row coordinates of the sampling point in a 2D (u, v) plane, u and v are in the range [0, 1] and W and H are the width and height of the ERP image respectively. The conversion from (m, n) to (u, v) is given by:

$$u=(m+0.5)/W \quad 0<=m<W$$

$$v=(n+0.5)/H \quad 0<=n<H$$

The conversion from the (u, v) plane to the longitude (φ) and latitude (θ) angles of the sphere, which are shown in FIG. 5, is given by:

$$\phi=2\pi(u-0.5)$$

$$\theta=2\pi(0.5-v)$$

Where φ is in the range [−π, π], measured Counter Clock Wise (CCW) from the X axis, and θ is in the range [−π/2, π/2], measured from the equator towards the Y axis.

The conversion from (φ, θ) to (X', Y', Z') coordinates on a unit sphere is given by:

$$X'=\cos(\theta)\cos(\phi)$$

$$Y'=\sin(\theta)$$

$$Z'=-\cos(\theta)\sin(\phi)$$

The sphere of the VR 360 video file may be defined using one or more coordinate systems, for example, the Euler angles and/or the like.

Figure 6:
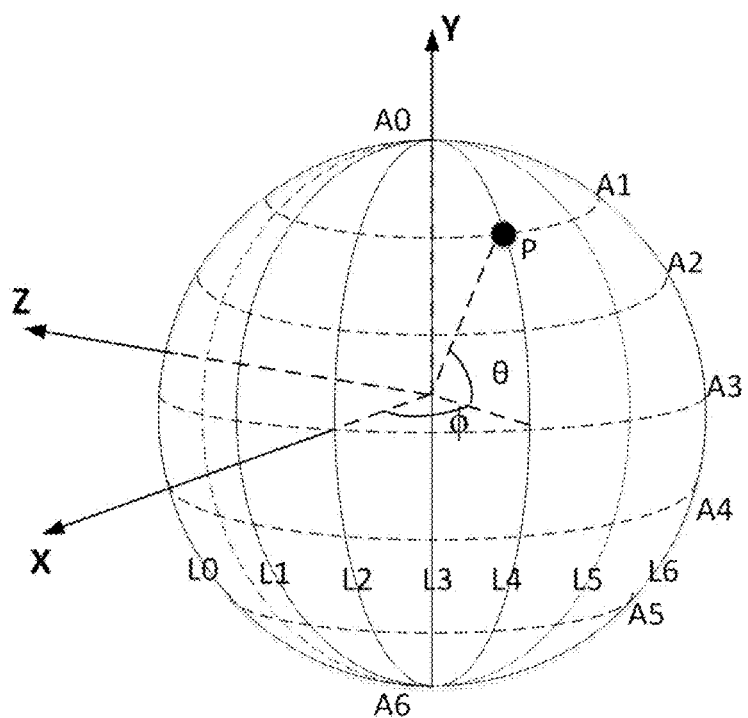
FIG. 6 is a schematic illustration of an Euler angles coordinate system.

Reference is now made to FIG. 6, which is schematic illustration of a Euler angles (spherical) coordinate system. The Euler angles coordinate system as known in the art defines yaw, pitch and roll which may be used to specify the relative rotation between a source and destination 3D coordinates. Yaw (which may be expressed as φ+π/2) specifies the counterclockwise rotation in degrees along the Y axis, pitch (which may be expressed as −θ) specifies the counterclockwise rotation in degrees along −Z axis and roll (which may be expressed as ψ) specifies the counterclockwise rotation in degrees along the X axis.

Reference is made once again to FIG. 5.

The EVP stream generator 452 may use a rotation matrix to rotate the sphere, specifically, the yaw, pitch and roll values in order to align Z axis of the sphere with the Z axis of respective overlapping segment assigned to the EVP stream generator 452.

The EVP stream generator 452 may apply the following conversion for the rotation:

$$[X,Y,Z]=R_{XYZ}\cdot[X',Y',Z']$$

Where $R_{XYZ}=R_Y(\text{yaw}_{server})\cdot R_Z(-\text{pitch}_{server})\cdot R_X(\text{roll}_{server})$, where ($\text{yaw}_{server}$, $-\text{pitch}_{server}$, $\text{roll}_{server}$) are the yaw, pitch and roll values defined for the respective overlapping segment.

Following the rotation, the pixels of the EFOV frame sphere may be efficiently enclosed by a rectangular as known in the art.

As shown at 510, the EVP stream generator 452 may convert the rotated overlapping sphere to an EFOV frame in one of the plurality of projection formats, for example, ERP, rectilinear projection, CMP, EAP, OHP and/or the like.

The EVP stream generator 452 may first crop the EFOV frame from the rotated overlapping sphere. The EVP stream generator 452 may apply the conversion as follows X, Y, Z→(φ_r, θ_r)→(u_r, v_r)→(m_r, n_r) to generate the EFOV frame in ERP format.

The conversion from (X, Y, Z) coordinates to the longitude and latitude (r, Or) is given by:

$$\phi_r = \arctan(-Z/X)$$

$$\theta_r = \arcsin\left(\frac{Y}{\sqrt{X^2+Y^2+Z^2}}\right)$$

The conversion from (φ_r, θ_r) coordinates to (u_r, v_r) plane is given by:

$$u_r=\phi_r/(2\pi)+0.5$$

$$v_r=0.5-\theta_r/\pi$$

The conversion from (u_r, v_r) to the point (m_r, n_r)

$$m_r=u_r*W-0.5$$

$$n_r=v_r*H-0.5$$

The EVP stream generator 452 may then convert the cropped overlapping segment 304 of the sphere to create the EFOV frame in one of the plurality of projection formats.

The EVP stream generator 452 may further interpolate ERP samples from neighboring points around (m_r, n_r) to the EFOV grid point (m, n). The interpolation may be needed since (m_r, n_r), which is a result of the projection from the sphere points (X, Y, Z) to point on the destination ERP plane, may not be located at grid point of the ERP frame. A more efficient alternative may be to first apply the interpolation at the source plane, i.e., ERP plane before the rotation by $R_{XYZ}$. In this preferred alternative these grid points are at the neighborhood of the inverse projection (and inverse rotation) point, which does not necessary fall at a grid point.

Optionally, the EVP stream generator 452 further converts one or more of the EFOV frames from the ERP format to rectilinear format.

As shown at 512, the encoder 454 may encode the generated EFOV frames using one or more encoding protocols, specifically video encoding protocols, for example, MPEG, H.264, H.265, H.266 and/or the like to generate the EVP stream.

The encoder 454 may further associate (include) additional data to one or more of the EFOV frames, for example, a time stamp, EFOV frame(s) status data, the coordinates of the overlapping segment corresponding to the EFOV frame and/or the like. The EFOV status data may include, for example, FOV data which may be expressed according to the coordinate system used by the server EVP stream generator 452, for example, assuming the Euler angles system, the FOV status data may be expressed through an FOV yaw value, an FOV pitch value and an FOV roll value. The EFOV status data may also include the dimensions, for example, a width, a height and/or the like of the EFOV frame respective overlapping segment. The EFOV status data may further include the dimensions, for example, the width, the height and/or the like of EFOV frame in the selected projection format, for example, the ERP format, the rectilinear format and/or the like. In addition, the EFOV status data may include the dimensions, for example, the width, the height and/or the like of a frame to be cropped from the EFOV frame at the client device 106 for presentation to the user 100 by the display 430.

The encoder 454 may encode the additional data using one or more techniques and/or implementations. For example, the encoder 454 may embed additional data of one or more of the EFOV frames in the respective EFOV frame itself, i.e. as part of the encoded EFOV frame data. In another example, the encoder 312 may add the additional data as metadata, for example, text data and/or the like, included in one or more headers of the EFOV frame and/or of the EVP stream. The encoder 454 may naturally add the metadata and/or text data to the header(s) of the EFOV frame and/or of the EVP stream according to the selected video encoding protocol. In another example, the encoder 454 may encode the additional data in one or more separate streams transmitted to the distribution device 104 via the network 122 separately from the EVP stream carrying the EFOV frames. The separately transmitted additional data may be associated with its respective EFOV frames by one or more means, for example, by assigning the additional data and identification code (ID) corresponding to the respective EFOV frames.

As shown at 514, a video transmitter such as the video transmitter 456 may transmit the N EVP streams generated by the plurality of EVP stream generator 452 to one or more of the distribution devices 104.

Optionally, in order to maintain low latency between the encoding apparatus 102 and the distribution device 104, the video transmitter 456 may operate the network interface 402 to deliver the EVP streams using a real time media transfer protocol, for example, Real Time Transport Protocol (RTP) and/or the like over an ultra-low latency video encoder-decoder channel having a delay of less than 10 ms (milliseconds).

Reference is now made to FIG. 7, which presents a plurality of captured EFOV frames each generated for a respective one of a plurality of overlapping segments of a sphere defined by a VR 360 video file, according to some embodiments of the present invention. FIG. 7 presents a plurality of viewports expressed by a plurality of EFOV frames each depicting a respective one of a plurality of overlapping segments of a sphere defined by an exemplary VR 360 video file. Each of the EFOV frames is part of a respective one of the plurality of EVP streams generated by a respective one of the plurality of EVP stream generator 452. As seen, the EFOV frames of each of the EVP streams largely overlaps with the EFOV frames depicting adjacent overlapping segments in the longitudinal and in the latitudinal axes (directions).

Reference is made once again to FIG. 5.

The iterative process may be done in real time streaming mode, where the created EVP streams are transmitted by the video transmitter 456 to the distribution device(s) 104. Optionally, the iterative process is done in offline mode where the created EVP streams are locally stored at the encoding apparatus 102, for example, in storage such as the storage 406. The stored EVP streams may be transmitted at a later time to one or more of the distribution devices 104, in particular upon request from the distribution device(s) 104. This mode of operation may be applied to provide a Video on Demand (VOD) service in which the video content, i.e. the stored EVP streams is already available at the encoding apparatus 102 and is transmitted by the video transmitter 456 in response to a demand from the distribution device(s) 104.

The plurality of the EVP stream may be transmitted and/or stored separately with the dataset mapping each of the EVP streams to the respective coordinates of their respective overlapping segments. Optionally, the plurality of the EVP stream may be transmitted and/or stored as a single file and/or stream with the dataset further mapping the location (i.e. start and end points) of the EVP streams in the single file and/or stream.

Optionally, the size of the overlapping segments and hence the area of the respective EFOV frames is adjusted according to a Quality of Service (QOS) and/or a Quality of Experience (QOE) which may be derived from the latency of the network 122 and/or the network 124. The latency, specifically the RTT indicating a back and forth communication travel time over the network, calculated and/or reported at the encoding apparatus 102 by a QOS/QOE controller such as the QOS/QOE controller 458. The QOS/QOE controller 458 may obtain QoS (Quality of Service) and/or QoE (Quality of Experience) information through one or more QoE messages received from a QOS/QOE generator such as the QOS/QOE generator 462 executed by one or more of the distribution devices 104.

The encoding apparatus 102 may adjust dynamically the area size of the EFOV frames, specifically, the $\text{Diff}_{Size}$ according to variations in the RTT. For example, assuming the QoS of one or more of the EVP streams to the distribution device 104 and/or to the client device(s) increases, i.e. the RTT of the EVP stream(s) increases, the encoding apparatus 102 may increase the size of the EFOV frames to increase the buffer of presentation data delivered to the client device(s) 106. The client device(s) 106 in turn may use the larger buffer to create FOV frames adapted to FOV changes at the client device 106 which took place during the travel time of the EVP stream from the distribution device 104. In another example, assuming the QoS of the EVP streams decreases, i.e. the RTT of the EVP streams decreases, the encoding apparatus 102 may reduce the size of the EFOV frames encoded in the EVP stream(S) to reduce the computing resources required at both the encoding apparatus 102 and at the client device(s) 106 for encoding and decoding respectively the EVP streams. Such reduction in the computing resources may involve reduction of processing resources, reduction of storage resources and/or the like. Moreover, the reduced EFOV frames may require reduced bandwidth of the network 124 and/or the network 122 for transferring the reduced size EVP streams. This may also reduce the RTT of the EVP streams and improve the QoE.

Similarly, the encoding apparatus 102 may dynamically adjust the EFOV frames of one or more of the EVP streams, specifically the area size of the EFOV frames, for example, the $\text{Diff}_{Size}$ according to the QoE information collected and/or calculated by the QOS/QOE controller 458 to effectively compensate for the reported and/or measured QoE. The QoE may be expressed, for example, by the MTP, i.e. the time between changing the FOV at the client device and the time when updated EFOV frame(s) corresponding to the FOV change are received and presented to the user 110.

Optionally, one or more of the EVP stream generator 452 generates multiple IDR shifted EVP streams for the respective overlapping segment. Each of the IDR shifted EVP streams contains an IDR frame in a successive frame of a Group of Pictures (GOP) of the VR 360 video, i.e. of the respective EVP stream.

The video encoding protocols used for encoding the EVP streams typically define a GOP for constructing the sequence of frames in the EVP stream. Each GOP comprises multiple consecutive frames which may be at least partially interdependent with each other. The number of frames in the GOP, for example, 4, 8, 12, etc. may vary according to one or more parameters of the video encoding protocol, for example, a type of the protocol, a profile of the protocol, content of the encoded video (e.g., scene dynamics, scene change, etc.) and/or the like.

Reference is now made to FIG. 8, which is a schematic illustration of a plurality of Instantaneous Decoding Refresh (IDR) Shifted EVP streams generated for a plurality of viewports of a sphere defined by a VR 360 video file, according to some embodiments of the present invention. An encoding apparatus such as the encoding apparatus 102 executing a plurality of EVP stream generators such as the EVP stream generator 452 may generate a plurality of IDR shifted EVP streams. FIG. 8 presents generation of IDR shifted EVP streams generated by a certain one of the EVP stream generators 452 generating EVP stream for example, EVP stream n−1, EVP stream n, and EVP stream n+1 each encoded with 8 frames GOPs. As shown the EVP stream generator 452 may generate a plurality of IDR shifted EVP streams for each of the EVP streams n−1, n, and n+1. Specifically, the EVP stream generator 452 generates 8 IDR shifted EVP streams such that each of the IDR shifted EVP streams contains an IDR frame in a consecutive frame of the GOP. This means that each of the IDR shifted EVP streams comprises GOPs where in each of the GOPs the IDR frame is located at different frame of the GOP. The number of the IDR shifted EVP streams created for a respective EVP stream may therefore equal the number of frames in the GOP. As such the first IDR shifted EVP stream (1) has the IDR frame at frame position 1, the second IDR shifted EVP stream (2) has the IDR frame at frame position 2, the third IDR shifted EVP stream (3) has the IDR frame at frame position 3 and so on to the eighth IDR shifted EVP stream (3) having the IDR frame at frame position 8.

Following the example presented for FIG. 2, FIGS. 3A-3C, the number N of IDR shifted EVP streams is 162×8=1296.

The EVP stream generator 452 may generate the plurality of IDR shifted EVP streams of the same viewport with substantially similar bit rate.

Reference is now made to FIG. 9, which is a flowchart of an exemplary process executed by a distribution device such as the distribution device 104 for delivering EVP streams to a plurality of client devices such as the client devices 106, according to some embodiments of the present invention.

As shown at 902, the process 900 starts with the distribution device 104, specifically a video distributer such as the video distributer 460 receiving a plurality of N EVP streams from an encoding apparatus such as the encoding apparatus 102.

As described for the process 500, the video distributer 460 may receive the EVP streams from the encoding apparatus in a real time streaming mode, where the created EVP streams are received and distributed to the client devices 106 simultaneously. Optionally, the video distributer 460 operates in an offline mode where the plurality of EVP streams are received in advance from the encoding apparatus 102 and are locally stored at the distribution device 104, for example, in storage such as the storage 416 for distribution to one or more of the client devices 106 at a later time. The offline operation mode may be applied, for example, to provide a VOD service in which the video content, i.e. the stored EVP streams is already available at the distribution device and is provided to one or more of the client devices 106 in response to a demand from the client device(s) 106.

As shown at 904, the video distributer 460 may receive current orientation data from one or more of the client devices 106 indicating a current orientation of the respective client device 106, specifically indicating a current FOV selected by a user such as the user 110 for viewing the VR 360 video file presented by a display such as the display 430. The current orientation data may include positioning information, for example, a horizontal FOV angle value, a vertical FOV angle value, a yaw value, a roll value and a pitch value, of the client device. The current orientation data may typically include a time stamp assigned to the current orientation data by the client device 106 where each time stamp indicates a capture time of the associated orientation data.

Optionally, the video distributer 460 receives from one or more of the client devices 106 indication of the currently presented frame in the GOP of the EVP stream. The indication indicates the frame, for example, a frame number, within a GOP of the EVP stream which is currently presented by the display 430 of the respective client device 106 to the respective user 110.

Optionally, a QOS/QOE generator such as the QOS/QOE generator 462 receives QoS information, for example the RTT and/or the like and/or QoE information, for example, the MTP and/or the like from one or more of the client devices 106. Based on the received QoS/QoE information the QOS/QOE generator 462 may calculate a network latency of the network 124. The QOS/QOE generator 462 may further collect and/or generate QoS/QoE information for the network 122. Moreover, the QOS/QOE generator 462 may transmit the QoS/QoE information for the network 122 and/or the network 124 to a QOS/QOE controller such as the QOS/QOE controller 458 executed by the encoding apparatus 102. As described herein before, based on the QoS/QoE information, the encoding apparatus may adjust the area size of the EFOV frames.

As shown at 906, for each of the client devices 106, the video distributer 460 selects one of the EVP streams according to the current orientation data received from the respective client device 106. This means that for each of the client devices 106 the video distributer 460 selects the EVP stream which is most appropriate according to the FOV (viewpoint) selected by the respective user 110 to view the VR 360 video file.

For each of the client devices 106, the video distributer 460 may analyze the respective current orientation data to identify the orientation of the respective client device 106 which indicates the FOV selected by the respective user 110. Based on the identified FOV, the video distributer 460 may select one of the EVP streams which best converges with the identified FOV, i.e. the center of the EFOV frames of the selected EVP stream is closest to the center of the identified FOV.

The video distributer 460 may select the EVP stream based on analysis of the dataset mapping each of the plurality of overlapping segments to its respective coordinates in the sphere defined by the VR 360 video file to identify the overlapping segment matching the coordinates of the identified FOV and select the EVP stream corresponding to the matching overlapping segment.

As shown at 908, the video distributer 460 transmits the selected EVP stream(s) to the respective client device(s) 106.

Optionally, in order to maintain low latency between the distribution device 104 and the client devices 106, the video distributer 460 may operate the network interface 412 to deliver the EVP streams to one or more of the client devices 106 using a real time media transfer protocol, for example, RTP and/or the like over an ultra-low latency video encoder-decoder channel having a delay of less than 10 ms (milliseconds).

The process 900 may include a plurality of iterations in which steps 904 through 908 are repeated for one or more of the client devices 106 to select the most appropriate EVP stream according to updated current orientation data received from the respective client device(s) 106.

During the iterations of the process 900, the video distributer 460 may maintain delivery of the same EVP stream corresponding to a certain overlapping segment of the sphere defined by the VR 360 video file to one or more of the client devices 106 or decide to switch to another EVP stream corresponding to an adjacent overlapping segment which is adjacent to the certain overlapping segment.

The video distributer 460 decides and selects the selected EVP stream for the certain client device as follows:

In case, based on the analysis of the current orientation data received from the certain client device 106, the video distributer 460 identifies the FOV selected by the user is substantially similar to the FOV selected during a previous iteration, the video distributer 460 delivers EFOV frames from the same EVP stream to the certain client device 106 thus retaining continuity of reference frames sequence (i.e. GOP structure) of the low-delay encoder.

In case, based on the analysis, the video distributer 460 identifies a change in the FOV selected by the user which exceeds a certain threshold value compared to the FOV selected during a previous iteration, the video distributer 460 may decide to switch to another EVP stream corresponding to the adjacent overlapping segment matching the newly selected FOV and deliver EFOV frames of the other EVP stream to the certain client device 106.

The threshold used by the video distributer 460 for determining whether to switch or not may be regarded as the handoff range as described in FIG. 3C. The change to the FOV may therefore be compared to the threshold as follows: if $$dx > \frac{Step}{2} \text{ where step} = \text{Diff}_{size} \text{ then:}$$

Switch to another EVP stream corresponding to an adjacent overlapping segment in the direction of dx, where dx is the angular displacement (change) in the FOV identified for the certain client device 106.

$$\text{if } dx < \frac{Step}{2} \text{ then:}$$

Maintain the current EVP stream.

Optionally, in particular in case of switching to another EVP stream corresponding to the adjacent overlapping segment, the video distributer 460 selects one of the IDR shifted EVP streams for transmission to the certain client device 106. This is of course feasible assuming the video distributer 460 has access to the IDR shifted EVP streams, either from in live streaming mode from the encoding apparatus 102 and/or from local storage such as the storage 416.

In case the video distributer 460 decides to transmit another EVP stream to the certain client device 106 and the other EVP stream is associated with a plurality of IDR shifted streams generated by the encoding apparatus 102, the video distributer 460 may select the IDR shifted EVP stream according to the indication of the currently presented frame in the GOP of the current EVP stream received from the certain client device 106. This may serve to inform a video decoder such as the video decoder 470 executed by the client device 106 that a new reference EFOV frame should be used since the previous reference EFOV frames which are part of the previously transmitted EVP stream are no longer relevant to the current and future EFOV frames.

Optionally, the video distributer 460 selects the EVP stream transmitted to one or more of the client devices 106 the EFOV frames according to an orientation prediction of the orientation of the respective client device 106. An orientation predictor such as the orientation predictor 464 may predict updates to the orientation of the client device 106 which is indicative of the FOV selected by the respective user 110. The orientation predictor 464 may base the prediction on the current orientation data received from the respective client device 106 and may be further base the prediction on orientation data received during one or more previous iterations of the process 900.

Optionally, the video distributer 460 selects the EVP stream transmitted to one or more of the client devices 106 the EFOV frames according to a request received from the respective client device 106. One or more of the client devices 106 may locally analyze the current orientation data to identify the change in the FOV selected by the respective user 110 similarly as done by the video distributer 460. Based on the analysis, the client device 106 may determine that a change in the FOV selected by the respective user 110 exceeds the threshold value compared to the FOV selected during a previous iteration (frame presentation). In such case the client device 106 may issue a switch request to the video distributer 460 requesting a switch to another EVP stream, specifically another IDR shifted EVP stream. The client device 106 may select the requested EVP stream and/or the requested IDR shifted EVP stream using one or more implementations. For example, the client device 106 may determine which of the EVP streams best matches the spatial change in the FOV using the mapping dataset mapping each of the EVP streams to the respective overlapping segments and coordinates in the sphere. The mapping dataset may be available to the client device 106 from the distribution device 104. Moreover, using the mapping information the client device 106 may indicate the start and end points of the requested EVP stream in the joined file in case such a file is created by the encoding apparatus 102. In another example, the mapping information mapping the coordinates of the corresponding overlapping segment may be included in the EVP stream, for example, in the metadata. In such case, the client device may identify which EVP best matches the newly selected FOV and may request the video distributer 460 to provide the EVP stream accordingly.

Moreover, as the client device 106 may be aware of the currently presented frame of the GOP, the client device 106 may request the video distributer 460 to provide the appropriate IDR shifted EVP stream. The client device 106 may identify the requested IDR shifted EVP stream using the mapping dataset.

Reference is now made to FIG. 10, which is a flowchart of an exemplary process executed by a client device such as the client device 106 for receiving EVP streams of a VR 360 video file presented by a display to a user, according to some embodiments of the present invention.

As shown at 1002, the process 1000 starts with a client frame manager such as the client frame manager 472 transmitting a request to a distribution device such as the distribution device 104 to open and establish a communication session for receiving (streaming) VR 360 video content, for example, a certain VR 360 video file and/or the like. The communication session may utilize a session link over a network such as the network 140, for example, a transport link, a transmission link and/or the like using one or more video content delivery (streaming) protocols, for example, MPEG, H.264, H.265 and/or the like.

The session link may support exchange of data, control data, messages and/or the like between the distribution device 104 and the client device 106. The session link may be used by the distribution device 104 to deliver the EVP stream(s) generated for the VR 360 video file to the client device 106. The session link may further be used by the client device 106 to issue control commands, for example, open, close, start, pause, play, resume and/or the like with respect to the provided VR 360 video content.

At the beginning of the session, the client frame manager 472 may transmit operational information to the distribution device 104, in particular capabilities of the client device 106 with respect to consumption and/or streaming of the VR 360 video. For example, the client frame manager 472 may transmit its available network resources (e.g., bandwidth, etc.), available computing resources, available storage resources and/or the like. The client frame manager may further transmit operational information relating to a display such as the display 430, for example, 2D presentation support, 3D presentation support, display size, display resolution and/or the like. The client frame manager 472 may also provide the distribution device 104 with operational information relating to interaction capabilities of the user 110 with the client device 106. Such operational information may include, for example, a maximal angular velocity supported and/or allowed for the client device 106 and/or the like.

At the start of the session, the client frame manager 472 may further report, define and/or negotiate a selected projection format, for example, ERP, rectilinear projection, CMP, EAP, OHP, PSP and/or the like. At this time, the client frame manager 472 may also report, define and/or negotiate a selected format of time stamping and/or the like which may be used during the EVP streams delivery session.

As shown at 1004, an orientation data generator such as the orientation data generator may transmit the current orientation data to the distribution device 104, specifically to a video distributer such as the video distributer 460. The current orientation data may indicate a current orientation of the client device 106, specifically a current FOV (e.g., a center of FOV) selected by the user 110 for viewing the frames of the VR 360 video file presented by the display 430 of the client device 106. The transmission of the current orientation data may be done at a higher rate than the rate of decoding the received EVP stream EFOV frames in order to increase responsiveness of the distribution device 104 to changes in the position (FOV) of the client device 106, thus reducing the MTP latency. For example, the current orientation data may be sent every one millisecond to the distribution device 104 while the EVP stream decoding may be done at a rate of, for example, 16.66 milliseconds (60 Hz), 11.11 milliseconds (90 Hz), 8.33 milliseconds (120 Hz) and/or the like. As such the orientation data generator 476 may operate independently of the client frame manager 472 thus avoiding the need to wait for completion of step 1020 before sending updated current orientation data to the distribution device 104.

The orientation data generator 476 may generate the current orientation data according to sensory data collected, obtained and/or received data from one or more sensors such as the sensor 428 adapted to monitor and capture the orientation of the client device 106. The type of sensors 428 as well as their deployment may naturally depend on the type and capabilities of the client device 106 and/or of the display 430.

For example, the client device 106 may include a HMD, stereoscopic goggles and/or the like in which the display 430 supports 3D presentation. In such case the sensor(s) 428 may include for example, an accelerometer, a gyroscope, an IMU, a laser position sensor, an imaging sensor and/or the like adapted to monitor and capture gestures and/or movements of the user 110. The gestures and/or movements of the user 110, for example, head gestures, hand(s) gestures, bodily gestures/movements and/or the like may indicate the orientation of the client device 106 selected by the user 110, specifically the FOV of the VR 360 video content selected by the user 110 to be presented by the display 430.

In another example the client device 106 may comprise a 2D display (flat screen) supporting a 2D presentation, for example, a Smartphone, a tablet and/or the like. In such case the sensor(s) 428 may include, for example, an accelerometer, a gyroscope, an IMU and/or the like adapted to monitor and capture the orientation of the client device 106 itself. The orientation of the client device 106 may indicate the FOV for viewing the VR 360 video content selected by the user 110 to be presented by the display 430. In such case the sensor(s) 428 may further be utilized by one or more pointing device, for example, a mouse, a touch screen, a touchpad and/or the like which may indicate the orientation selected by the user 110 for viewing the VR 360 video content.

The current orientation data may include positioning information, for example, the horizontal FOV angle value, the vertical FOV angle value, the yaw value, the roll value and the pitch value, of the client device 106. The current orientation data may typically include a time stamp assigned to the current orientation data where each time stamp indicates a capture time of the associated orientation data. The time stamp may be assigned to the associated orientation data by the orientation data generator 472 and/or by one or more of the sensors 428 capturing the sensory data.

Optionally, a QOS/QOE collector such as the QOS/QOE collector 474 collects and transmits the QoS information and/or the QoE information, for example, the RTT, the MTP and/or the like to the distribution device 104, specifically to a QOS/QOE generator such as the QOS/QOE generator 462. The QoS and/or the QoE information may be indicative of the latency, specifically the RTT of data delivery over the network 124 from the distribution device 104 to the client device 106.

As shown at 1006, a decoder such as the decoder 470 may receive an encoded EVP stream comprising one or more EFOV frames from the distribution device 104, specifically from the video distributer 460. The EVP stream may be encoded using one or more encoding protocols, specifically video encoding protocols, for example, MPEG, H.264, H.265, H.266 and/or the like. The EVP stream and/or one or more additional streams may further include the additional data associated with one or more of the EFOV frames. The decoder 470 may decode the stream(s) to extract the EFOV frames and optionally the associated additional data.

The decoder 470 may provide the EFOV frames and/or the additional data to the client frame manager 472. The decoder 470 may further provide data, in particular the additional data to the QOS/QOE collector 474 which may generate the QoS and/or QoE information based on the timing information of the additional data, for example, the time stamps included in the additional data. The QOS/QOE collector 474 may calculate the RTT according to timing information, for example, the time stamps.

As shown at 1008, the client frame manager 472 obtains updated current orientation data from the orientation data generator 476 which generates the updated current orientation data according to updated sensory data obtained from the sensor(s) 428. The updated current orientation data indicates an updated orientation of the client device 106 which may have changed since the selection of the EVP stream transmitted from the distribution device 104 to the client device 106. The updated current orientation data may be designated by (yaw$_{client}$, pitch$_{client}$, roll$_{client}$) which are the updated current yaw, pitch and roll values of the client device 106.

Since the orientation of the client device 106 may have changes, i.e. the user 150 has selected a new FOV to view the VR 360 video presented by the display 430, the EFOV frames of the EVP stream selected by the distribution device 104 according to the previously transmitted current orientation data, may not be aligned with the updated current orientation data. One or more of the EFOV frames extracted from the EVP stream may therefore need to be adjusted, for example, cropped, shifted, zoomed-in/zoomed-out and/or the like in order to adapt to the updated current orientation data.

As shown at 1010, the client frame manager 472 defines a size of the FOV frame to be presented by the display 430, for example, a width, a height and/or the like. The client frame manager 472 may apply the operations and/or methods described in step 508 of the process 500 to define the size of the FOV frame naturally using different parameters. The client frame manager 472 may define the size of the FOV frame ($W_{VP}$, $H_{VP}$) according to:
  Updated values of FOV angles, i.e. the horizontal FOV angle value ($F_H$) and the vertical FOV angle value ($F_V$).
  Dimensions of the ERP format.

The client frame manager 472 may also define the updated grid points ($m_{client}$, $n_{client}$) of the frame to be generated for presentation by the display 430.

The client frame manager 472 may then project the grid points ($m_{client}$, $n_{client}$) on a sphere as follows: ($m_{client}$, $n_{client}$)→($u_{client}$, $v_{client}$)→(X', Y', Z').

Reference is now made to FIG. 11, which is a schematic illustration of viewport generation with rectilinear projection.

The conversion from grid points on the viewport frame ($m_{client}$, $n_{client}$)
  $0 \leq m_{client} < W_{VP}$
  $0 \leq n_{client} < H_{VP}$
to the 2D ($u_{client}$, $v_{client}$) plane for rectilinear projection is given by:

$$u_{client} = (m_{client}+0.5)*2*\tan(F_H/2)/W_{VP}$$

$$v_{client} = (n_{client}+0.5)*2*\tan(F_V/2)/H_{VP}$$

Then, the conversion from ($u_{client}$, $v_{client}$) to the 3D coordinates (X, Y, Z):

$$X = u_{client} \cdot \tan(F_H/2)$$

$$Y = -v_{client} \cdot \tan(F_V/2)$$

$$Z = 1$$

Projecting the point (X, Y, Z) to the point (X', Y', Z') on the unit sphere is given by:

$$X' = X/\sqrt{X^2+Y^2+Z^2}$$

$$Y' = Y/\sqrt{X^2+Y^2+Z^2}$$

$$Z' = 1/\sqrt{X^2+Y^2+Z^2}$$

As shown at 1012, the client frame manager 472 may rotate the segment of the sphere to align the segment of the sphere with the updated FOV selected by the user 110 and indicated by the updated current orientation of the client device 106. The client frame manager 472 may apply the operations and/or methods described in step 508 of the process 500 to rotate the sphere.

The client frame manager 472 may use a rotation matrix to rotate the sphere, specifically the segment of the sphere, according to the updated current orientation data, specifically, the updated current yaw, pitch and roll values of the client device 106 in order to align Z axis of the sphere with the Z axis of the FOV of the user 110.

The client frame manager 472 may apply the following conversion for the rotation:

$$[X,Y,Z] = R_{XYZ_{client}} \cdot R'_{XYZ_{server}} [X',Y',Z'].$$

Where $$R_{XYZ_{client}} = R_Y(\text{yaw}_{client}) \cdot R_Z(-\text{pitch}_{client}) \cdot R_X(\text{roll}_{client}),$$
and $$R'_{XYZ_{server}} = R_X(-\text{roll}_{server}) \cdot R_Z(\text{pitch}_{server}) \cdot R_Y(-\text{yaw}_{server}).$$

The rotation consists of multiplication of two rotation matrixes. The first rotation ($R'_{XYZ_{server}}$) is applied to each point [X', Y', Z'] on the unit sphere to inverse the rotation that was applied at the server. The second rotation ($R_{XYZ_{client}}$) is then applied such that the pixels of the EFOV frame sphere may be aligned with the FOV of the user 110 expressed through the updated current orientation data.

As shown at 1014, the client frame manager 472 may convert the rotated segment of the sphere of the EFOV frame to one of a plurality of projection formats, for example, ERP, rectilinear projection, CMP, EAP, OHP, PSP and/or the like. The client frame manager 472 may apply the operations and/or methods described in step 510 of the process 500 to convert the updated EFOV frame. The client frame manager 330 may apply the conversion as follows [X, Y, Z]→($\phi_r$, $\theta_r$)→($u_r$, $v_r$)→($m_r$, $n_r$) as described in step 510 of the process 500.

As shown at 1016, the client frame manager 472 may crop an actual FOV frame from the rotated EFOV according to the updated orientation data. The client frame manager 472 may crop the ERP part of the EFOV frame, designated EFOV$_{crop}$ and its indices ($m_{r_{crop}}$, $n_{r_{crop}}$) related to the actual FOV frame.

The client frame manager 472 may further interpolate ERP samples from ($m_{r_{crop}}$, $n_{r_{crop}}$) to ($m_{client}$, $n_{client}$) grid point using the EFOV$_{crop}$ as described in step 510 of the process 500. The interpolation is needed since ($m_{client}$, $n_{client}$), which is a result of the projection from the sphere points (X, Y, Z) to point on the destination ERP plane, may not be located at a grid point in the ERP plane. A more efficient alternative is to first apply the interpolation of ERP samples at the source plane, i.e., ERP plane before the rotation by $R_{XYZ_{client}} \cdot R'_{XYZ_{server}}$. In this preferred alternative these grid points are at the neighborhood of the inverse projection (and inverse rotation) point, which is not necessary falls at a grid point.

As shown at 1018, the client frame manager 472 may convert the actual FOV frame in the ERP projection format to a projection format supported by the display 430, for example, the rectilinear projection format.

Naturally, in case the display 430 supports 3D presentation, the client frame manager 472 repeats the process to generate two actual FOV frames, the first for the right eye and the second for the left eye. For client devices 106 in which the display 430 supports only 2D presentation, a single actual FOV frame may be created.

As shown at 1020, the client frame manager 472 may instruct the display 430 to present the actual FOV frames.

The process 1000 may include a plurality of iterations in which steps 1006 through 1020 are repeated to receive the EVP stream from the distribution device 104 selected according to the current orientation data, and step 1004 may be repeated in higher rate to transmit the current orientation data.

As discussed herein before, transmission of the current orientation data (step 1004) may be done at higher rates than the rate decoding the EFOV frames (steps 1006-1020) in order to increase responsiveness of the distribution device 104 to changes in the position (FOV) of the client device 106, thus reduce the MTP latency. The orientation data generator 476 may therefore operate independently of the client frame manager 472 thus avoiding the need to wait for completion of step 1020 before sending updated current orientation data to the distribution device 104.

Reference is now made to FIG. 12, which is a capture of an exemplary VR 360 video frame, an exemplary respective EFOV frame generated from the VR 360 video frame and a respective actual FOV frame generated from the EFOV frame, according to some embodiments of the present invention. An exemplary VR 360 video 1202 may be processed, for example, cropped, rendered and/or the like by an EVP stream generator such as the EVP stream generator 452 according to the segmentation scheme of the sphere defined by the VR 360 video file. The EVP stream generator 452 may create an exemplary EFOV frame 1204 which is centered in the Euler angles coordinates system at ($\phi=0$, $\theta=0$, $\psi=0$). The EFOV frame 1204 may then be encoded in an EVP stream and transmitted to a distribution device such as the distribution device 104 which may in turn transmit it to a client device such as the client device 106. A decoder such as the decoder 470 executed by the client device 106 may receive the EVP stream carrying the EFOV frame 1204 and decode the EVP stream to extract the EFOV frame 1204. A client frame manager such as the client frame manager 472 may process the EFOV frame 1204 to generate a respective actual FOV frame 1206 in rectilinear projection format which is adjusted according to the size of the actual FOV frame presented by a display such as the display 430. Moreover, as can be seen, the EFOV frame 1204 is rotated according to updated current orientation data such that the FOV frame 1206 is centered at ($\phi=4$, $\theta=0$).

It is expected that during the life of a patent maturing from this application many relevant projection formats, encoding techniques and video transport will be developed and the scope of the terms projection formats, encoding techniques and video transport are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The invention claimed is:

1. An encoding apparatus for generating a plurality of extended viewport streams of virtual reality (VR) data for delivery to a plurality of client devices, comprising:
   a processor connected to receive a VR video file, the processor configured for:
   segmenting a sphere defined in the VR video file projected in an equirectangular projection (ERP) format into at least first and second overlapping segments that overlap one another; and
   creating at least first and second extended viewport streams for the VR video file, the first extended viewport stream including respective encoded extended field of view (EFOV) frames corresponding to the first overlapping segment, the second extended viewport stream including respective encoded extended field of view (EFOV) frames corresponding to the second overlapping segment, by iteratively performing operations comprising:
   applying a rotation to the first overlapping segment of the sphere, cropping from the first rotated overlapping segment of the sphere, converting the cropped first overlapping segment to a respective first extended field of view (EFOV) frame, applying a rotation to the second overlapping segment of the sphere, cropping from the second rotated overlapping segment of the sphere, and converting the cropped second overlapping segment to a respective second extended field of view (EFOV) frame, and instructing a network to transmit the encoded extended field of view (EFOV) frames of the respective first and second extended viewport streams to one or more distribution devices, wherein the processor is further configured to segment the sphere into the at least first and second overlapping segments according to an EFOV frame area calculated according to a maximum angular velocity of a display used to present one of the first and second extended viewport streams.

2. The encoding apparatus of claim 1, wherein the processor is further configured to segment the sphere to the at least first and second overlapping segments according to the EFOV frame area that takes into account an estimated latency value for a communication between the encoding apparatus and the one or more distribution devices, wherein the processor is further configured to calculate the estimated latency value according to a time stamp included in a Quality of Experience, QoE, message comprising Round Trip delay Time, RTT, data originating from the one or more distribution devices.

3. The encoding apparatus of claim 1, wherein the processor is configured to encode each of the EFOV frames in one of a plurality of projection formats, the plurality of projection formats including one or more members of a group consisting of: ERP, rectilinear projection, cubemap projection, CMP, equal-area projection, EAP, octahedron projection, OHP and Platonic Solid Projection, PSP.

4. The encoding apparatus of claim 1, wherein the processor is further configured to convert each EFOV frame from the equirectangular projection format to a rectilinear format before adding the EFOV frame to a corresponding one of the first and second extended viewport streams.

5. An encoding apparatus for generating a plurality of extended viewport streams of virtual reality (VR) data for delivery to a plurality of client devices, comprising:

a processor connected to receive a VR video file, the processor configured for:

segmenting a sphere defined in the VR video file projected in an equirectangular projection (ERP) format into at least first and second overlapping segments that overlap one another; and creating at least first and second extended viewport streams for the VR video file, the first extended viewport stream including respective encoded extended field of view (EFOV) frames corresponding to the first overlapping segment, the second extended viewport stream including respective encoded extended field of view (EFOV) frames corresponding to the second overlapping segment, by iteratively performing operations comprising:

applying a rotation to the first overlapping segment of the sphere, cropping from the first rotated overlapping segment of the sphere, converting the cropped first overlapping segment to a respective first extended field of view (EFOV) frame, applying a rotation to the second overlapping segment of the sphere, cropping from the second rotated overlapping segment of the sphere, and converting the cropped second overlapping segment to a respective second extended field of view (EFOV) frame, and instructing a network to transmit the encoded extended field of view (EFOV) frames of the respective first and second extended viewport streams to one or more distribution devices, wherein the processor is further configured to create a plurality of instantaneous decoding refresh, IDR, shifted viewport streams for each of the at least first and second extended viewport streams by repeating each of the plurality of iterated operations starting in a consecutive frame of a group of pictures, GOP, of the VR video file, wherein the number of the plurality of IDR shifted viewport streams created for each of the at least first and second extended viewport streams equals a number of frames in the GOP such that each of the plurality of IDR shifted viewport streams of each of the at least first and second extended viewport streams includes an IDR frame at a different frame position in the GOP.

6. The encoding apparatus of claim 1, wherein the processor is further configured to locally store at least one of the at least first and second extended viewport streams in the encoding apparatus until requested by one or more of the distribution devices.

7. A method of generating a plurality of extended viewport streams of virtual reality (VR) data for delivery to a plurality of client devices, comprising:

operating a processor of an encoding apparatus to perform operations comprising:

reading from a VR video file;

segmenting a sphere defined in the VR video file projected in an equirectangular projection, ERP format into at least first and second overlapping segments that overlap one another;

creating a first extended viewport stream for the VR video file by iteratively performing operations comprising the following:

applying a rotation to the first overlapping segment of the sphere, cropping from the first rotated overlapping segment of the sphere, and converting the cropped first overlapping segment to a respective first encoded extended field of view, EFOV, frame, creating a second extended viewport stream for the VR video file by iteratively performing operations comprising the following:

applying a rotation to the second overlapping segment of the sphere, cropping from the second rotated overlapping segment of the sphere, and converting the cropped second overlapping segment to a respective second encoded extended field of view, EFOV, frame, and
instructing the network to transmit the encoded extended field of view (EFOV) frames of the respective first and second extended viewport streams to one or more distribution devices, wherein the processor is further configured to segment the sphere into the at least first and second overlapping segments according to an EFOV frame area calculated according to a maximum angular velocity of a display used to present one of the first and second extended viewport streams.

8. A distribution device for delivering a selected one of a plurality of viewport streams of virtual reality (VR) data to each of a plurality of client devices, comprising:
a processor configured to perform operations comprising:
receiving, via a network, at least first and second extended viewport streams of a VR video file, the at least first and second extended viewport streams each comprising a sequence of encoded extended field of view (EFOV) frames created for a respective one of a plurality of rotated and cropped overlapping segments constituting a sphere defined in the VR video file, wherein the plurality of overlapping segments constituting the sphere overlap one another; and
delivering the at least first and second extended viewport streams to a plurality of client devices connected to the distribution device via one or more other networks by performing the following for each of the plurality of client devices in each of a plurality of iterations:
receiving a current orientation data of the respective client device,
selecting one of the at least first and second extended viewport streams according to the received current orientation data, and
transmitting the selected extended viewport stream to the respective client device,
wherein for each of the plurality of client devices, the processor is further configured to select one of a plurality of instantaneous decoding refresh, IDR, shifted viewport streams received for each of the at least first and second extended viewport streams, each of the plurality of IDR shifted viewport streams received for each of the at least first and second extended viewport streams includes an IDR frame at a different frame position in the GOP, of the respective extended viewport stream,
the processor being further configured to select the selected IDR shifted viewport stream according to the indication of the currently presented frame received from the respective client device in case, based on the current orientation data received from the respective client device, the processor being further configured to switch from a current extended viewport stream of the at least first and second extended viewport streams currently transmitted to the respective client device to an adjacent viewport stream of the at least first and second extended viewport streams,
the adjacent extended viewport stream comprising EFOV frames created for an overlapping segment of the at least first and second overlapping segments which is adjacent to a current overlapping segment of the at least first and second overlapping segments encoded in the current extended viewport stream.

9. The distribution device of claim 8, wherein the processor is further configured to locally store one or more of the at least first and second extended viewport streams in the distribution device after reception until delivery to one or more of the client devices.

10. The distribution device of claim 8, wherein the orientation data comprises one or more members of the group consisting of: a horizontal field of view, FOV, angle value, a vertical FOV angle value, a yaw value, a roll value and a pitch value, of the respective client device.

11. The distribution device of claim 8, wherein the current orientation data of the respective client device comprises a time stamp.

12. The distribution device of claim 8, wherein the current orientation data of the respective client device comprises an indication of a currently presented frame within a group of pictures, GOP of the respective extended viewport stream comprising the EFOV currently presented by a display of the respective client device.

13. The distribution device of claim 8, wherein the processor is further configured to select the extended viewport stream for one or more of the plurality of client devices according to a prediction of future orientation data estimated for that client device.

14. The distribution device of claim 8, wherein the processor is further configured to select the extended viewport stream for one or more of the plurality of client devices according to a request received from the respective client device indicating a requested extended viewport stream.

15. The encoding apparatus of claim 1, wherein the processor is further configured to create N shifted viewport streams for each of the at least first and second extended viewport streams, wherein the number N of shifted viewport streams created for each of the at least first and second extended viewport streams equals a number of frames in a group of pictures (GOP), each of the N shifted viewport streams of each of the at least first and second extended viewport streams including a decoding refresh indicator at a different frame position in the GOP.

* * * * *